US011357036B2

(12) United States Patent
Jiang et al.

(10) Patent No.: US 11,357,036 B2
(45) Date of Patent: Jun. 7, 2022

(54) METHOD AND APPARATUS FOR COMMUNICATION BASED ON SHORT TRANSMISSION TIME INTERVALS IN A WIRELESS COMMUNICATION SYSTEM

(71) Applicant: NEC CORPORATION, Tokyo (JP)

(72) Inventors: Chuangxin Jiang, Beijing (CN); Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 741 days.

(21) Appl. No.: 16/469,015

(22) PCT Filed: Jan. 29, 2016

(86) PCT No.: PCT/CN2016/072845
§ 371 (c)(1),
(2) Date: Jun. 12, 2019

(87) PCT Pub. No.: WO2017/128312
PCT Pub. Date: Aug. 3, 2017

(65) Prior Publication Data
US 2021/0307048 A1    Sep. 30, 2021

(51) Int. Cl.
*H04W 72/04* (2009.01)
*H04W 72/12* (2009.01)
*H04L 5/14* (2006.01)

(52) U.S. Cl.
CPC .......... *H04W 72/1289* (2013.01); *H04L 5/14* (2013.01); *H04W 72/0446* (2013.01); *H04W 72/1268* (2013.01)

(58) Field of Classification Search
CPC ......... H04W 72/1289; H04W 72/1268; H04W 72/0446; H04L 5/14
See application file for complete search history.

(56) References Cited

U.S. PATENT DOCUMENTS 8,780,841 B2    7/2014 Earnshaw et al.
10,117,192 B2 * 10/2018 Takeda ................ H04W 52/228
(Continued)

FOREIGN PATENT DOCUMENTS

CN    101507344 A    8/2009
CN    105246164 A    1/2016
(Continued)

OTHER PUBLICATIONS

Communication dated Aug. 5, 2020, from the Canadian Intellectual Property Office in application No. 3,045,349.
(Continued)

*Primary Examiner* — Lan-Huong Truong
(74) *Attorney, Agent, or Firm* — Sughrue Mion, PLLC

(57) ABSTRACT

Embodiments of the present disclosure relates to the communication processes in a FDD wireless communication system based on short TTIs. According to one embodiment of the present disclosure, there provide a method for communication by a base station. The method comprise: transmitting, to a user equipment, downlink control information in a downlink TTI of a $m^{th}$ downlink subframe which supports two or more downlink TTIs; and receiving, from the user equipment, uplink data scheduled by the downlink control information carried in a $m^{th}$ or $(m+1)^{th}$ uplink subframe which supports two or more uplink TTIs. The downlink control information transmitted in at least one of downlink TTIs supported by downlink subframes is arranged to schedule uplink data transmission in at least two of uplink TTIs supported by uplink subframes. In the other aspects of the present disclosure, there also provides methods for communication by a user equipment and corresponding apparatuses.

16 Claims, 18 Drawing Sheets

(56) References Cited

U.S. PATENT DOCUMENTS

| | | | |
|---|---|---|---|
| 2013/0114525 A1 | 5/2013 | Ahmadi | |
| 2014/0293843 A1* | 10/2014 | Papasakellariou | H04L 1/00 |
| | | | 370/280 |
| 2014/0293893 A1* | 10/2014 | Papasakellariou | H04W 72/0446 |
| | | | 370/329 |
| 2014/0362832 A1* | 12/2014 | Rudolf | H04L 1/1864 |
| | | | 370/336 |
| 2015/0341866 A1* | 11/2015 | Park | H04L 1/1812 |
| | | | 455/522 |
| 2018/0123769 A1* | 5/2018 | Pelletier | H04L 5/0094 |

FOREIGN PATENT DOCUMENTS

| | | |
|---|---|---|
| EP | 2 914 043 A2 | 9/2015 |
| WO | 2015/072774 A1 | 5/2015 |

OTHER PUBLICATIONS

Huawei, et al., "Motivation for new study item proposal on New LTE Frame Structure for TDD", 3GPP TSG-RAN Meeting #70, RP-15185, Dec. 7-10, 2015, 8 pages.
International Search Report for PCT/CN2016/072845 dated Oct. 28, 2016 [PCT/ISA/210].
Communication dated May 14, 2021, from the Canadian Intellectual Property Office in application No. 3,045,349.

* cited by examiner

METHOD AND APPARATUS FOR COMMUNICATION BASED ON SHORT TRANSMISSION TIME INTERVALS IN A WIRELESS COMMUNICATION SYSTEM

CROSS REFERENCE TO RELATED APPLICATIONS

This application is a National Stage of International Application No. PCT/CN2016/072845, filed on Jan. 29, 2016.

TECHNICAL FIELD

The present disclosure generally relates to wireless communication, particularly to methods and apparatuses for communication based on shortened Transmission Time Intervals (TTIs) in a Frequency-Division Duplexing (FDD) communication system.

BACKGROUND

This section is intended to provide a background to the various embodiments of the invention that are described in this disclosure. The description herein may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs). The radio protocol stacks of the E-UTRAN is given including a radio resource control layer (RRC), a packet data convergence protocol layer (PDCP), a radio link control layer (RLC), a media access control layer (MAC), and a physical layer (PHY).

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In LTE, data can be transmitted from the UE to the eNodeB via a physical uplink shared channel (PUSCH). The PUSCH carries scheduled data traffic and possible control signaling. The PUSCH can be carried in subframes of a radio frame. Further, data can also be transmitted from the eNodeB to UE via a physical downlink shared channel (PDSCH). PDSCH is also carried in one ms subframes and is downlink scheduled over respective TTIs. Conventionally, a one millisecond (ms) subframe containing 14 symbols, can only allow a one ms TTI, which is the smallest time unit to schedule the DL and UL transmission.

FIGS. 1A and 1B schematically illustrate a hybrid automatic request (HARQ) process of UL data scheduling and acknowledgement feedback for a FDD communication system.

As shown in FIG. 1A, in the UL data scheduling procedure, the downlink control information (DCI) carried in the $m^{th}$ subframe is scheduled to transmit from the eNodeB to the UE in the $m^{th}$ TTI. Upon receipt of DCI, the UE will be scheduled to perform uplink PUSCH transmission in the $(m+k)^{th}$ TTI. Similarly, in the acknowledgement feedback procedure, as shown in FIG. 1B, the downlink transmission on PDSCH is downlink transmitted from the eNodeB to the UE in the $m^{th}$ TTI. The UE will detect and decode the received data on PDSCH and send back to the eNodeB a corresponding acknowledgement (ACK) or non-acknowledgement (NACK) for PDSCH in the $(m+k)^{th}$ TTI. The parameter k may be a predefined integer which may depend upon at least the processing delay at the UE. As specified in 3GPP TS 36.213, k may be set as 4. That means, the actual UL transmission of the scheduled PUSCH or the ACK/NACK for PDSCH has to be delayed after 4 TTIs, which is 4 ms.

In the 3GPP RAN #67 meeting, the Study Item on "Study on Latency reduction techniques for LTE" was approved. For RAN1, TTI shortening and reduced processing times should be studied and documented at least in following aspects:

study feasibility and performance of TTI lengths between 0.5 ms and one OFDM symbol is studied, taking into account impact on reference signals and physical layer control signaling;

backwards compatibility shall be preserved, thus allowing normal operation of pre-Rel 13 UEs on the same carrier.

Nevertheless, it is concluded in the study that "by reducing the TTI length, the network can schedule the UE faster, which reduces the round trip time (RTT). A reduction in RTT increases the TCP throughput. A reduction of TTI length may also increase the system capacity for small data transmission."

Therefore, there is a need to provide solutions for communication based on short transmission time intervals in the FDD communication system.

SUMMARY

One or more method and apparatus embodiments according to the present disclosure aim to provide one or more solutions for communication based on shortened TTIs. Other features and advantages of embodiments of the present disclosure will also be understood from the following description of specific embodiments when read in conjunction with the accompanying drawings, which illustrate the principles of embodiments of the present disclosure.

According to the first aspect of the present disclosure, there is provided a method for communication by a base station operating in a wireless communication system. The method comprises: transmitting, to a user equipment, downlink control information in a downlink transmission time interval, TTI, of a $m^{th}$ downlink subframe which supports two or more downlink TTIs; and receiving, from the user equipment, uplink data scheduled by the downlink control information carried in a $m^{th}$ or $(m+1)^{th}$ uplink subframe which supports two or more uplink TTIs. In these embodiments of the present disclosure, the downlink control information transmitted in at least one of downlink TTIs supported by downlink subframes is arranged to schedule uplink data transmission in at least two of uplink TTIs supported by uplink subframes. According to one or more embodiments, the multiple TTI scheduling may be performed in the case of a mismatch between the number of DL TTIs in DL subframes and the number of UL TTIs in UL subframes.

According to the second aspect of the present disclosure, there is provided a method for communication by a user equipment operating in a wireless communication system. The method comprises: receiving, from a base station, downlink control information in a downlink transmission time interval, TTI, of a $m^{th}$ downlink subframe which supports two or more downlink TTIs; and transmitting, to the base station, uplink data scheduled by the downlink control information, carried in a $m^{th}$ or $(m+1)^{th}$ uplink subframe which supports two or more uplink TTIs. According to these embodiments of the present disclosure, the downlink control information transmitted in at least one of downlink TTIs supported by downlink subframes is arranged to schedule uplink data transmission in at least two of uplink TTIs supported by uplink subframes. According to one or more embodiments, the multiple TTI scheduling may be performed in the case of a mismatch between the number of DL TTIs in DL subframes and the number of UL TTIs in UL subframes.

According to the third aspect of the present disclosure, there is provided a method for communication by a base station operating in a wireless communication system. The method comprises: transmitting, to a user equipment, downlink control information in a downlink transmission time interval, TTI, of a $m^{th}$ downlink subframe which supports two or downlink more TTIs; and receiving, from the user equipment, uplink data scheduled by the downlink control information carried in a $m^{th}$ or $(m+1)^{th}$ uplink subframe which supports two or more uplink TTIs. According to these embodiments of the present disclosure, one uplink TTI in each of the uplink subframes is arranged to transmit uplink demodulation reference signals of user equipments scheduled by the base station, instead of scheduled uplink data.

According to the fourth aspect of the present disclosure, there is provided a method for communication by a user equipment operating in a wireless communication system. The method comprises: receiving, from a base station, downlink control information in a downlink transmission time interval, TTI, of a $m^{th}$ downlink subframe which supports two or more downlink TTIs; and transmitting, to the base station, uplink data scheduled by the downlink control information carried in a $m^{th}$ or $(m+1)^{th}$ uplink subframe which supports two or more uplink TTIs. According to these embodiments of the present disclosure, one special uplink TTI in each of the uplink subframes is arranged to transmit uplink demodulation reference signals of user equipments scheduled by the base station, instead of scheduled uplink data.

According to the fifth aspect of the present disclosure, there provides a method for communication by a base station operating in a wireless communication system. The method comprises: transmitting, to a user equipment, downlink data in a downlink transmission time interval, TTI, of a $m^{th}$ downlink subframe which supports two or more downlink TTIs; and receiving, from the user equipment, acknowledgement, ACK,/non-acknowledgement, NACK, feedback information for the transmitted downlink data in an uplink TTI which is k-TTI later than the downlink TTI in which the downlink data is transmitted, the ACK/NACK feedback information being carried in a $m^{th}$ or $(m+1)^{th}$ uplink subframe which supports two or more uplink TTIs. According to these embodiments of the present disclosure, the last TTI of an uplink subframe is arranged to transmit sounding reference signals, without ACK/NACK feedback information for downlink data transmission.

According to the sixth aspect of the present disclosure, there provides method for communication by a user equipment operating in a wireless communication system. The method comprises: receiving, from a base station, downlink data in a downlink transmission time interval, TTI, of a $m^{th}$ downlink subframe which supports two or more downlink TTIs; and transmitting, to the base station, acknowledgement, ACK,/non-acknowledgement, NACK, feedback information for the downlink data in an uplink TTI which is k-TTI-later than the downlink TTI in which the downlink data is transmitted from the base station, the ACK/NACK feedback information being carried in a $m^{th}$ or $(m+1)^{th}$ uplink subframe which supports two or more uplink TTIs. According to these embodiments of the present disclosure, the last TTI of an uplink subframes is arranged to transmit sounding reference signals, without ACK/NACK feedback information for downlink data transmission.

According to the seventh aspect of the present disclosure, there provides a method for communication by a base station operating in a wireless communication system. The method comprises: transmitting, to a user equipment, downlink data in a downlink transmission time interval, TTI, of a $m^{th}$ downlink subframe which supports two or more downlink TTIs; and receiving, from the user equipment, acknowledgement, ACK,/non-acknowledgement, NACK, feedback information for the transmitted downlink data in an uplink TTI which is k-TTI or (k+1)-TTI later than the downlink TTI in which the downlink data is transmitted, the ACK/NACK feedback information being carried in a $m^{th}$ or $(m+1)^{th}$ uplink subframe which supports two or more uplink TTIs. In these embodiments of the present disclosure. According to these embodiments of the present disclosure, the first TTI of a downlink subframe is arranged to transmit downlink control information, and the last TTI of an uplink subframe is arranged to transmit sounding reference signals, without ACK/NACK feedback information for downlink data transmission.

According to the eighth aspect of the present disclosure, there provides a method for communication by a user equipment operating in a wireless communication system. The method comprises: receiving, from a base station, downlink data in a downlink transmission time interval, TTI, of a $m^{th}$ downlink subframe which supports two or more downlink TTIs; and transmitting, to the base station, acknowledgement, ACK,/non-acknowledgement, NACK, feedback information for the downlink data in an uplink TTI which is k-TTI or (k+1)-TTI later than the downlink TTI in which the downlink data is transmitted from the base station, the ACK/NACK feedback information being carried in a $m^{th}$ or $(m+1)^{th}$ uplink subframe which supports two or more uplink TTIs. According to these embodiments of the present disclosure, the first TTI of a downlink subframe is arranged to transmit downlink control information, and the last TTI of an uplink subframe is arranged to transmit sounding reference signals, without ACK/NACK feedback information for downlink data transmission.

According to the ninth aspect of the present disclosure, there provides a method for communication by a base station in a wireless communication system. The method comprises: transmitting, to a user equipment, downlink control information for uplink data scheduling or downlink data transmission in a downlink transmission time interval, TTI, of a downlink subframe which supports two or more downlink TTIs. According to these embodiments of the present disclosure, during a predefined time window that contains at least two TTIs, only one TTI of the at least two TTIs is arranged to transmit the downlink control information in an full format and the remaining TTI(s) of the at least two TTIs is arranged to transmit the downlink control information in a short format.

According to the tenth aspect of the present disclosure, there provides a method for communication by a user equipment in a wireless communication system. The method comprises: receiving, from a base station, downlink control information for uplink data scheduling or downlink control information for downlink data transmission in a downlink transmission time interval, TTI, of a downlink subframe which supports two or more downlink TTIs. According to these embodiments of the present disclosure, during a predefined time window that contains at least two TTIs, only one TTI of the at least two TTIs is arranged to transmit the downlink control information in a full format and the remaining TTI(s) of the at least two TTIs is arranged to transmit the downlink control information in a short format.

According to the eleventh aspect of the present disclosure, there provides a method for communication by a base station operating in a wireless communication system. The method comprises: transmitting, to a user equipment, downlink control information in a $n^{th}$ downlink transmission time interval, TTI, of a $m^{th}$ downlink subframe which supports two or more downlink TTIs; and receiving, from the user equipment, uplink data scheduled by the downlink control information in a $n^{th}$ uplink TTI of a $(m+1)^{th}$ uplink subframe which supports two or more uplink TTIs.

According to the twelfth aspect of the present disclosure, there provides a method for communication by a user equipment operating in a wireless communication system. The method comprises: receiving, from a base station, downlink control information in a $n^{th}$ downlink transmission time interval, TTI, of a $m^{th}$ downlink subframe which supports two or more downlink TTIs; and transmitting, to the base station, uplink data scheduled by the downlink control information in a $n^{th}$ uplink TTI of a $(m+1)^{th}$ uplink subframe which supports two or more uplink TTIs.

According to the thirteenth aspect of the present disclosure, there provides a method for communication by a base station operating in a wireless communication system. The method comprises: transmitting, to a user equipment, downlink control information and downlink data in a $n^{th}$ downlink transmission time interval, TTI, of a $m^{th}$ downlink subframe which supports two or more downlink TTIs; and receiving, from the user equipment, acknowledgement, ACK,/non-acknowledgement, NACK, feedback information for the transmitted downlink data in a $n^{th}$ TTI of a $(m+1)^{th}$ uplink subframe which supports two or more uplink TTIs.

According to the fourteenth aspect of the present disclosure, there provides a method for communication by a user equipment operating in a wireless communication system. The method comprises: receiving, from a base station, downlink control information and downlink data in a $n^{th}$ downlink transmission time interval, TTI, of a $m^{th}$ downlink subframe which supports two or more downlink TTIs; and transmitting, to the base station, acknowledgement, ACK,/non-acknowledgement, NACK, feedback information for the transmitted downlink data in a $n^{th}$ uplink TTI of a $(m+1)^{th}$ uplink subframe which supports two or more uplink TTIs.

According to further aspects of the present disclosure, there provides apparatus for communication by a base station. The apparatus comprises a transmitting unit and a receiving unit, which are adapted to perform functions as described above in the first, third, fifth, seventh, ninth, eleventh, thirteenth aspects of the present disclosure.

According to further aspects of the present disclosure, there provides apparatus for communication by a user equipment. The apparatus comprises a transmitting unit and a receiving unit, which are adapted to perform functions as described above in the second, fourth, sixth, eighth, tenth, twelfth, fourteenth aspects of the present disclosure.

According to further aspects of the present disclosure, there also provides a base station. The base station comprises processing means adapted to perform the methods for communication by a base station according to any of various embodiments of the present disclosure.

According to further aspects of the present disclosure, there also provides a user equipment. The user equipment comprises processing means adapted to perform the methods for communication by a user equipment according to any of various embodiments of the present disclosure.

BRIEF DESCRIPTION OF THE DRAWINGS

Inventive features regarded as the characteristics of the present invention are set forth in the appended claims.

However, the present invention, its implementation mode, other objectives, features and advantages will be better understood through reading the following detailed description on the exemplary embodiments with reference to the accompanying drawings, where in the drawings.

DETAILED DESCRIPTION

Hereinafter, embodiments of the present disclosure will be described with reference to the accompanying drawings. In the following description, many specific details are illustrated so as to understand the present disclosure more comprehensively. However, it is apparent to the skilled in the art that implementation of the present invention may not have these details. Additionally, it should be understood that the present invention is not limited to the particular embodiments as introduced here. On the contrary, any combination of the following features and elements may be considered to implement and practice the present invention, regardless of whether they involve different embodiments. For example, while it is described below in the context of 5G cellular communication system for illustrative purposes, those skilled in the art will recognize that one or more embodiments of the present disclosure can also be applied to various other types of cellular communication systems. Thus, the following aspects, features, embodiments and advantages are only for illustrative purposes, and should not be understood as elements or limitations of the appended claims, unless otherwise explicitly specified in the claims.

A user equipment (UE) may comprise, be implemented as, or known as an access terminal, a subscriber station, a subscriber unit, a mobile station, a remote station, a remote terminal, a user terminal, a user agent, a user device, a user station, or some other terminology.

In some implementations a user equipment may comprise a cellular telephone, a cordless telephone, a Session Initiation Protocol (SIP) phone, a personal digital assistant (PDA), a handheld device having wireless connection capability, a Station (STA), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

A base station (BS) may comprise, be implemented as, or known as NodeB, Radio Network Controller (RNC), eNodeB (eNB), Base Station Controller (BSC), Base Transceiver Station (BTS), Transceiver Function (TF), Radio Router, Radio Transceiver, Basic Service Set (BSS), Extended Service Set (ESS), Radio Base Station (RBS), or some other terminology.

Figure 2:
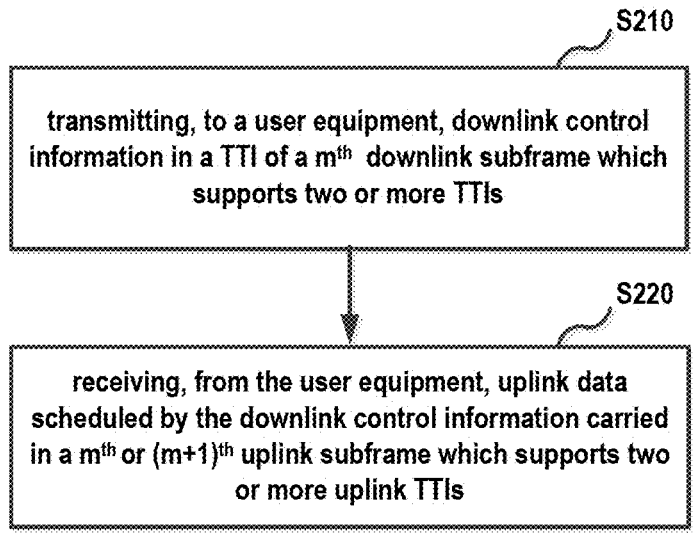
FIG. 2 is a diagram schematically illustrating a method for communication by a base station according to one or more embodiments of the present disclosure.

FIG. 2 is a diagram schematically illustrating a method 200 for communication by a base station according to one or more embodiments of the present disclosure. More specifically, the method 200 depicts an uplink data scheduling process of a FDD wireless communication system from the perspective of a base station.

As shown in the FIG. 2, the method enters from step S210. In step S210, downlink control information (DCI) can be transmitted from a base station to a user equipment in a short DL TTI of a $m^{th}$ DL subframe. In a DL subframe structure based on short TTIs, a DL subframe supports two or more DL TTIs. The respective TTIs may have the same or different TTI length from others. For example, in a 14-symbol subframe structure, short TTIs may be 1-symbol-based TTIs, 2-symbol-based TTIs, 3-symbol-based TTIs, . . . , 13-symbol-based TTI, and any combination thereof. In general, the subframe structure based on short TTIs is designed for latency reduction, especially for 2-symbol-based TTIs or 3-symbol-based TTIs.

Figure 1A:
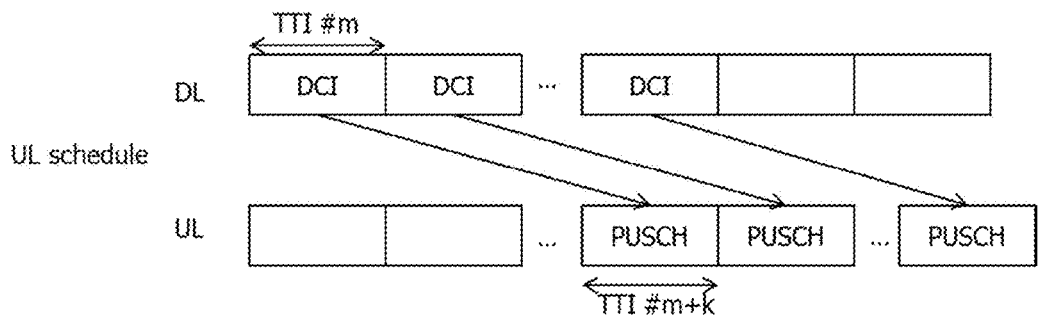
FIGS. 1A and 1B schematically illustrate a HARQ process of UL data scheduling and acknowledgement feedback, respectively, for a FDD wireless communication system.
Figure 1B:
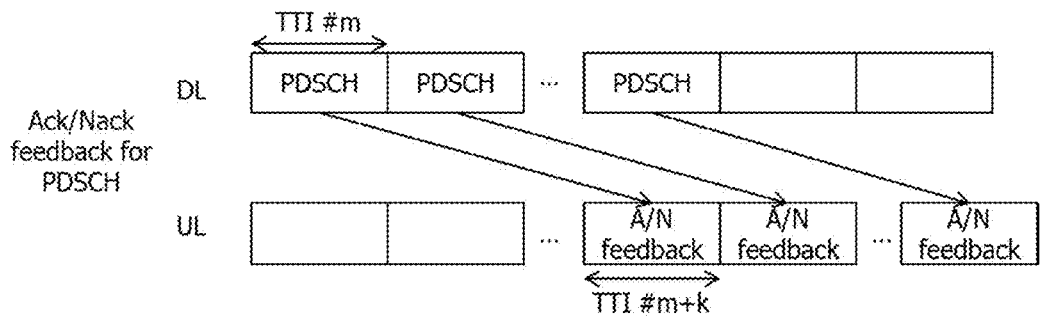

In step S220, the base station can receive uplink data scheduled by the downlink control information from the user equipment. The scheduled uplink data is carried in a $m^{th}$ or $(m+1)^{th}$ uplink subframe. Similar to DL subframe, in a UL subframe structure based on short TTIs, a UL subframe supports two or more DL TTIs. The respective TTIs may have the same or different TTI length from others. As described with reference to FIG. 1A, the user equipment may delay a number k uplink TTIs to transmit the scheduled uplink data, for example, in a physical uplink shared channel (PUSCH).

For example, in a 14-symbol subframe structure, short TTIs may be 1-symbol-based TTIs, 2-symbol-based TTIs, 3-symbol-based TTIs, . . . , 13-symbol-based TTI, and any combination thereof. In general, the subframe structure based on short TTIs is designed for latency reduction, especially for 2-symbol-based TTIs or 3-symbol-based TTIs. Although the DL/UL subframe structure with a length of 14 symbols and supporting 2-symbol-based TTIs and/or 3-symbol-based TTIs are taken as examples to illustrate embodiments of the present disclosure, a person skilled in the art may appreciate that the principle and concept of the present invention can also be applied in any other suitable subframe structure.

Figure 3:
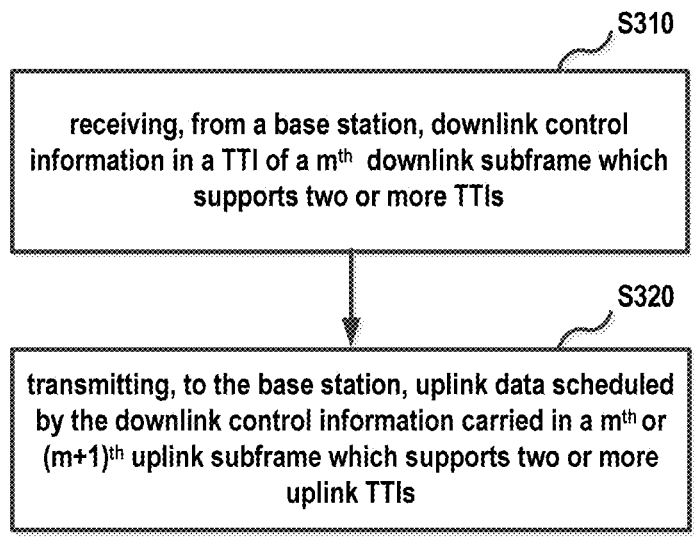
FIG. 3 is a diagram schematically illustrating a method for communication by a user equipment according to one or more embodiments of the present disclosure.

FIG. 3 is a diagram schematically illustrating a method 300 for communication by a user equipment according to one or more embodiments of the present disclosure. More specifically, the method 300 depicts an uplink data scheduling process of a FDD wireless communication system from the perspective of a user equipment.

As shown in FIG. 3, the method 300 enters in step S310. In step S310, the user equipment receives from the base station the DCI in a downlink TTI of the $m^{th}$ downlink subframe which supports two or more downlink TTIs. And in step S320, the uplink data in PUSCH scheduled by the received DCI is transmitted to the base station in an uplink TTI which is k TTIs after the DCI was received.

According to one or more embodiments of the present disclosure, the DCI transmitted in at least one of downlink TTIs supported by downlink subframes is arranged to schedule uplink data transmission in at least two of uplink TTIs supported by uplink subframes. For example, the multiple TTI scheduling may be performed in the case of a mismatch between the number of DL TTIs in DL subframes and the number of UL TTIs in UL subframes.

The methods 200, 300 of FIGS. 2, 3 may be performed based on the DL and UL subframe structures as shown in FIGS. 4-8, which will be set forth in details below.

Figure 4:
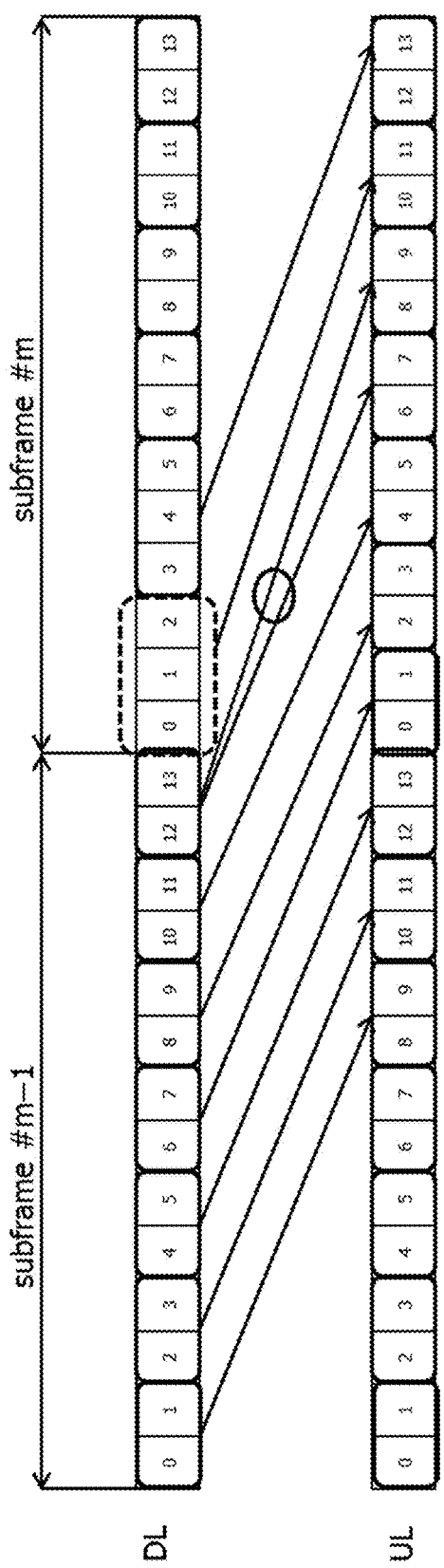
FIG. 4 is a diagram schematically illustrating exemplary DL and UL subframe structures based on short TTIs according to one or more embodiments of the present disclosure.

FIG. 4 is a diagram schematically illustrating exemplary DL and UL subframe structures based on short TTIs according to one or more embodiments of the present disclosure.

It is assumed that 2-symbol-based TTIs are designed to be supported by both the DL subframes and UL subframes, so as to reduce latency as much as possible. With reference to FIG. 4, both DL subframe #m−1 and UL subframe #m−1 include 14 symbols and support 2-symbol-based TTIs. Suppose k=4, then like legacy LTE HARQ process for FDD, the DCI transmitted in the $n^{th}$ DL TTI including symbols #0, #1 of the $(m-1)^{th}$ DL subframe will be used to grant the PUSCH transmission in the $(n+4)^{th}$ UL TTI including #8, #9 of the $(m-1)^{th}$ UL subframe. However, at least one 3-symbol-based TTI needs to be supported by a DL subframe. The 3-symbol-based TTI except the first TTI in one subframe can be posited on any continuous 3 symbols in one subframe. For example, when legacy Physical Downlink Control Channel (PDCCH) region occupies 3 symbols (shown as the dashed box including symbols #0, #1, #2 of subframe #m), another 3-symbol-based TTI may exist in the DL subframe, e.g. the DL TTI including symbol #3, #4, #5 of subframe #m, so as to avoid remaining one single symbol as a separate TTI. In that case, the number of DL TTIs supported by DL subframe #m is less than the number of UL TTIs supported by UL subframe #m.

In order to keep 4-TTI scheduling delay, one of DL TTIs in one DL subframe can be arranged to schedule PUSCH transmission in at least two of uplink TTIs supported by uplink subframes. According to the example of FIG. 4, it can be seen that in DL subframe #m−1, the base station may do the 2 TTI scheduling in the DL TTI which corresponds to symbols #12, #13 of DL subframe #m−1, so as to perform UL data transmission in multiple UL TTIs, which correspond to symbols #6, #7 and symbols #8, #9 in UL subframe #m, as shown in FIG. 4. More generally, when a mismatch between the numbers of DL and UL TTIs exists, (for example, in FIG. 4, the number of DL TTIs in subframe #m is less than the number of UL TTIs in subframe #m), the multiple TTI scheduling may be performed in a DL TTI of a previous DL subframe (for example, in FIG. 4, DL subframe #m).

However, it should be appreciated that according to various embodiments of the present disclosure, the multiple TTI scheduling may not be performed necessarily in the last DL TTI of a previous DL subframe as shown in FIG. 4, but may be performed in any designated or predefined TTI in a DL subframe, which will not go beyond the scope of the present disclosure.

In an alternative embodiment of the present disclosure, in the case of a mismatch between the number of DL TTIs in DL subframes and the number of UL TTIs in UL subframes, at least one of uplink TTIs supported by uplink subframes may be arranged to transmit at least an uplink demodulation reference signal (DMRS) for the user equipment, instead of scheduled uplink data. Return to the DL and UL subframe structures as shown in FIG. 4, instead of being scheduled by the DL TTI corresponding to symbols #12, #13, the blank UL TTI of symbols #8, #9 may be arranged to transmit DMRS of multiple user equipment scheduled by the BS for frequency tracking and Doppler estimation.

Figure 5:
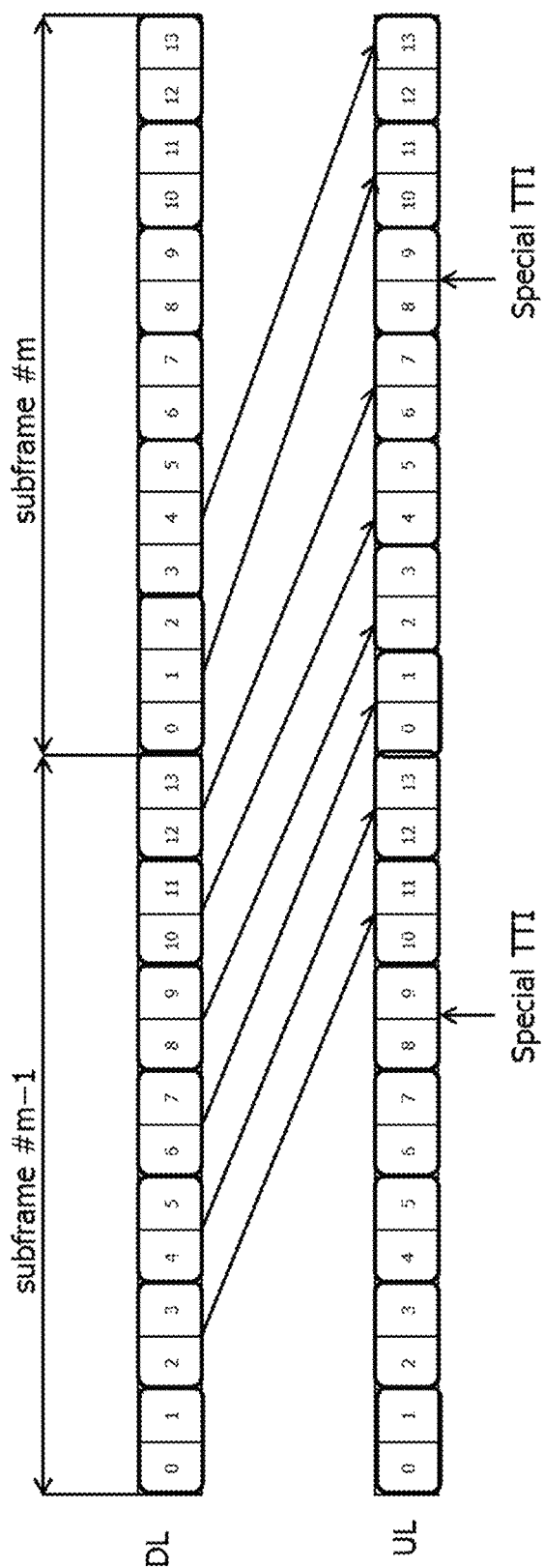
FIG. 5 is a diagram schematically illustrating further exemplary DL and UL subframe structures based on short TTIs according to an embodiment of the present disclosure.

FIG. 5 is a diagram schematically illustrating further exemplary DL and UL subframe structures based on short TTIs according to another embodiment of the present disclosure.

As shown in FIG. 5, similar to the example of FIG. 4, it is also assumed that 2-symbol-based TTIs are designed to be supported by both the DL subframes and UL subframes, so as to reduce latency as much as possible. With reference to FIG. 5, both DL subframe #m−1 and UL subframe #m−1 include 14 symbols and support 2-symbol-based TTIs. Suppose k=4, then like legacy LTE HARQ process for FDD, the DCI transmitted in the $n^{th}$ DL TTI including symbols #0, #1 of the $m^{th}$ DL subframe will be used to grant the PUSCH transmission in the $(n+4)^{th}$ UL TTI including #8, #9 of the $(m-1)^{th}$ UL subframe. In order to solve the problem caused by the mismatched between the number of DL TTIs in a DL subframe and the number of UL TTIs in a corresponding UL subframe, it is proposed to arrange a special UL TTI in each of the UL subframes to transmit UL DMRS of multiple UEs scheduled by the base station, but without transmitting any scheduled uplink data. That means, in this special UL TTI, no PUSCH is scheduled for UL transmission. As shown in FIG. 5, the UL TTI corresponding to symbols #8, #9 in each of the UL subframes (which may be blank when legacy PDCCH region occupies 3 symbols, as discussed with reference to FIG. 4) may be predefined as the special TTI, which UL DMRS transmission (not contained PUSCH) can be triggered by the base station such as eNodeB, or configured by high layer signaling.

Figure 6:
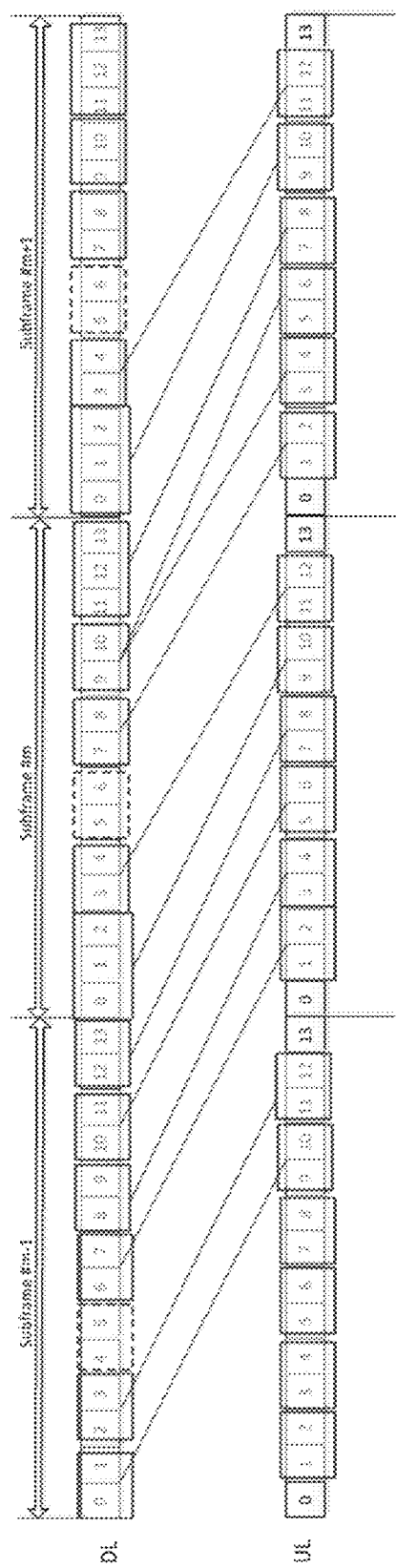
FIG. 6 is a diagram schematically illustrating further exemplary DL and UL subframe structures based on short TTIs according to an embodiment of the present disclosure.

When considering the transmission of sounding reference signal (SRS) transmission, it will be more complicated in the arrangement of DL and UL subframe structure. FIG. 6 is a diagram schematically illustrating further exemplary DL and UL subframe structures based on short TTIs according to an embodiment of the present disclosure, where the SRS transmission is considered. As illustrated in FIG. 6, it may be required that any UL TTI does not occupy the last symbol #13 of every UL subframe, which is reserved for possible SRS transmission. Therefore, there will remain one UL symbol in every UL subframe as a special TTI. In the example of FIG. 6, the one-symbol-based special TTI corresponds to symbol #0, which is arranged to transmit UL DMRS of multiple UEs scheduled by the base station, but without transmitting any scheduled uplink data. The UL DMRS transmission in special TTI corresponding to symbol #0 can be triggered in a corresponding DL TTI of the DL subframe, e.g. in the DL TTI of symbols #4, #5 in subframe #m−1, the DL TTI of symbols #5, #6 in subframe #m. As an alternative, the UL DMRS transmission in the special TTI may also be periodic transmission, which configured by a radio resource control (RRC) signaling.

It may be advantageous to adjust the UL scheduling scheme so that a DL TTI corresponding to the symbol #13 of UL subframe #m−1 and/or symbol #0 of UL subframe #m is arranged not to perform any PUSCH scheduling. As illustrated in FIG. 6, the DL TTI of symbols #4, #5 in DL subframe #m−1, which corresponds to symbol #0 of UL subframe #m, may be arranged not to transmit DCI to schedule any PUSCH transmission. In the similar way, in DL subframe #m, the DL TTI of symbols #5, #6 may correspond to symbol #0 of UL subframe #m+1, and thus may be arranged not to transmit DCI to schedule any PUSCH transmission in those symbols so as to avoid SRS transmission and the special TTI.

It can be seen that the available DL TTI number for performing uplink data scheduling in subframe #m is less than the UL TTI number in subframe #m, multiple TTI scheduling may be performed in a DL TTI of DL subframe #m. In the example shown in FIG. 6, the DL TTI of symbols #9, #10 in DL subframe #m is used to schedule the UL TTI of symbols #3, #4 and the UL TTI of symbols #5, #6 in subframe #m+1.

It should be noted that as to avoid the collision with SRS transmission at the last symbol of every UL subframe, a 3-symbol-based UL TTI may be introduced to each UL subframe to cover the one separate symbol, if one-symbol-based special TTI is not used.

Figure 7:
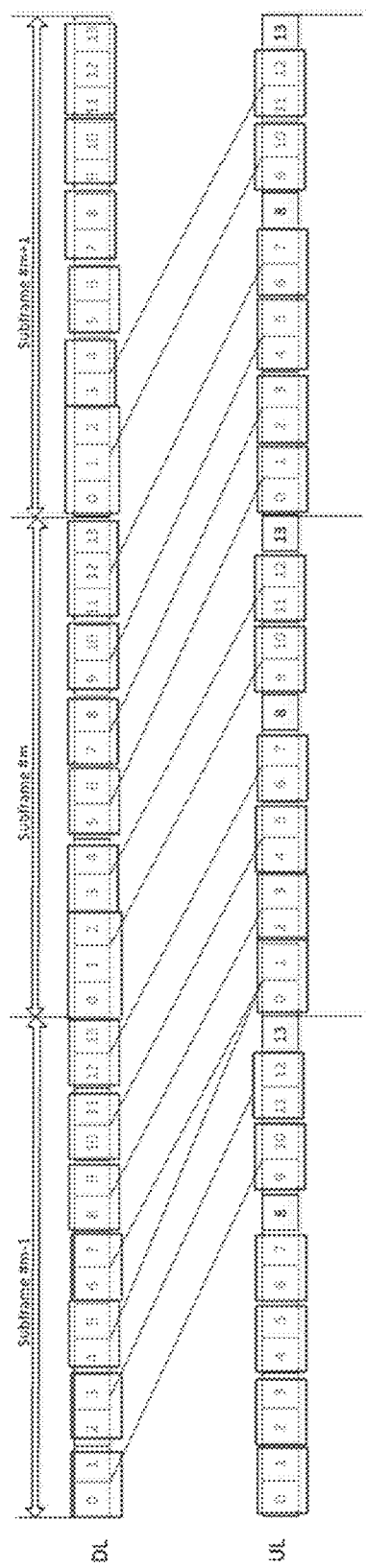
FIG. 7 is a diagram schematically illustrating further exemplary DL and UL subframe structures based on short TTIs according to an embodiment of the present disclosure.

FIG. 7 is a diagram schematically illustrating further exemplary DL and UL subframe structures based on short TTIs according to an embodiment of the present disclosure. The DL and UL subframe structures are similar to those illustrated by FIG. 6. One major difference is in that the one-symbol-based special TTI is posited separately from the symbol reserved for potential SRS transmission. For example, as shown in FIG. 7, symbol 8 of each UL subframe is arranged as a special TTI for DMRS transmission.

Since the number of UL TTIs in DL subframe #m−1 may be less than the number of DL TTIs in UL subframe #m−1 due to introducing a separate one-symbol special TTI, two consecutive DL TTIs may be arranged to schedule the PUSCH transmission in the same UL TTI. In FIG. 7, the DL TTI of symbols #4, #5 and the DL TTI of symbols #6, #7 may be arranged to schedule the uplink data transmission in the same UL TTI of symbols #0, #1 in UL subframe #m.

Figure 8:
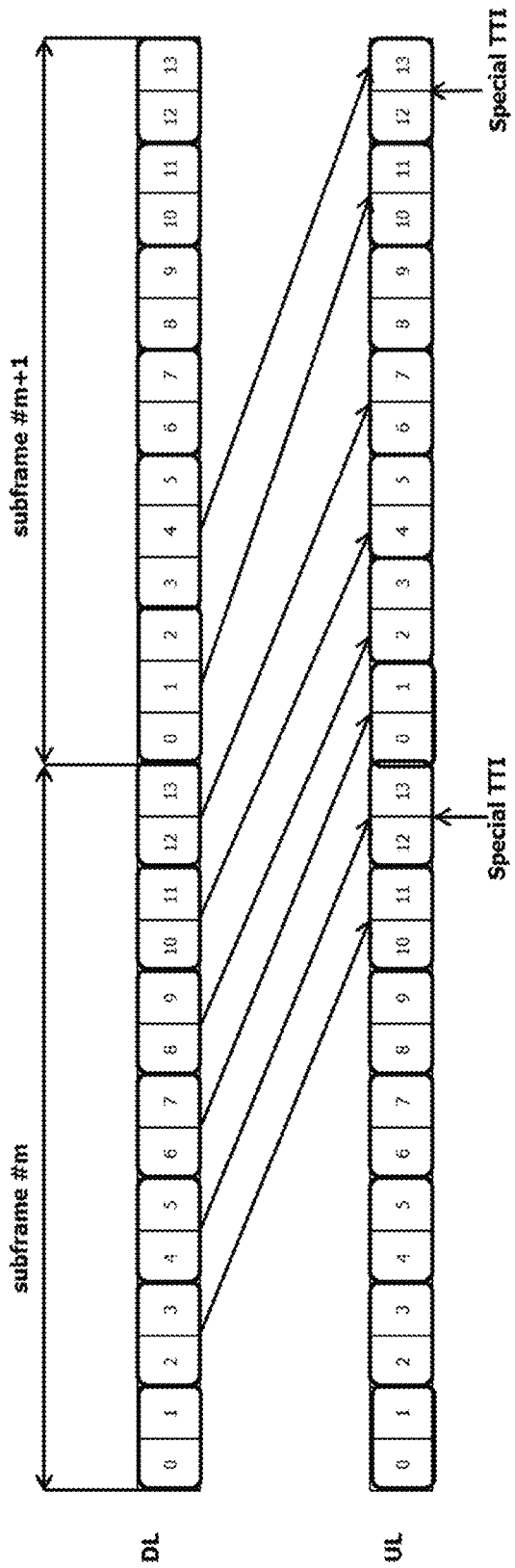
FIG. 8 is a diagram schematically illustrating further exemplary DL and UL subframe structures based on short TTIs according to an embodiment of the present disclosure.

FIG. 8 is a diagram schematically illustrating further exemplary DL and UL subframe structures based on short TTIs according to an embodiment of the present disclosure. FIG. 8 illustrates another variant for the solution involving the special TTI. According to the example of FIG. 8, the special TTI may be two-symbol-based TTI, which includes one symbol reserved for potential SRS transmission and the other symbol being arranged to exclusively transmit UL DMRS of multiple UEs scheduled by the base station, but without transmitting any scheduled uplink data.

Figure 9:
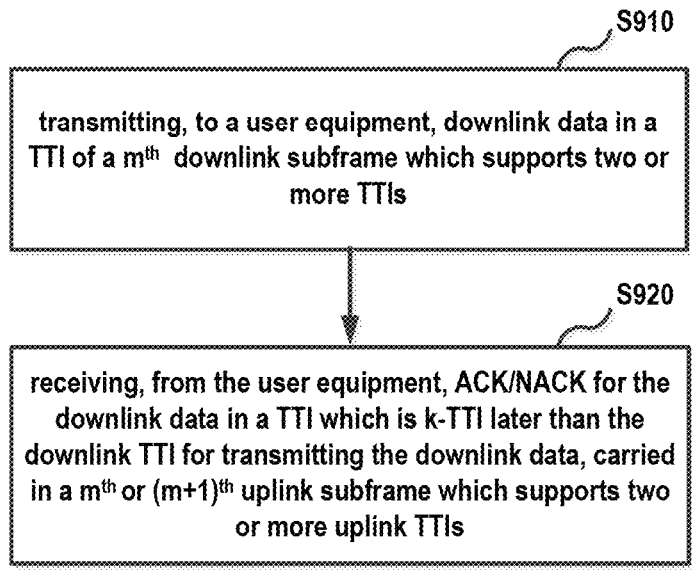
FIG. 9 is a diagram schematically illustrating a method for communication by a base station according to one or more embodiments of the present disclosure.

FIG. 9 is a diagram schematically illustrating a method 900 for communication by a base station according to one or more embodiments of the present disclosure. More specifically, the method 900 depicts a downlink data transmission process of a FDD wireless communication system from the perspective of a base station.

As shown in FIG. 9, the method 900 enters step S910. In step S910, downlink data is transmitted from the base station to a user equipment in a DL TTI of a m$^{th}$ DL subframe which supports two or more DL TTIs.

In step S920, the base station can receive, from the user equipment, ACK/NACK feedback information for the transmitted downlink data in a UL TTI which is k-TTI later than the DL TTI in which the downlink data is transmitted. The ACK/NACK feedback information can be carried in the m$^{th}$ or (m+1)$^{th}$ UL subframe which supports two or more uplink TTIs. The last TTI of an UL subframe is arranged to transmit sounding reference signals, without ACK/NACK feedback information for downlink data transmission.

Figure 10:
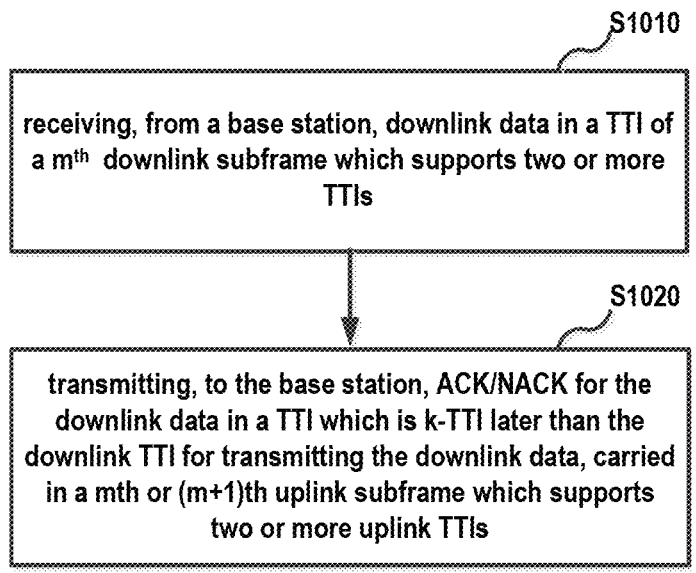
FIG. 10 is a diagram schematically illustrating a method for communication by a user equipment according to one or more embodiments of the present disclosure.

FIG. 10 is a diagram schematically illustrating a method for communication by a user equipment according to one or more embodiments of the present disclosure. More specifically, the method 1000 depicts a downlink data transmission process of a FDD wireless communication system from the perspective of a user equipment.

As shown in FIG. 10, the method 1000 enters step S1010.

In step S1010, the user equipment receives, from a base station, downlink data in a DL TTI of a the m$^{th}$ downlink subframe which supports two or more downlink TTIs.

In step S1020, after k-TTI delay, the user equipment transmits, to the base station, ACK/NACK feedback information for the downlink data in a UL TTI which is k-TTI-later than the DL TTI in which the downlink data is transmitted from the base station. The ACK/NACK feedback information can be carried in the m$^{th}$ or (m+1)$^{th}$ uplink subframe which supports two or more uplink TTIs. The last TTI of an UL subframes is arranged to transmit sounding reference signals, without ACK/NACK feedback information for downlink data transmission.

The methods 900, 1000 of FIGS. 9, 10 may be performed based on the DL and UL subframe structures as shown in FIGS. 11-14, which will be set forth in details below.

Figure 11:
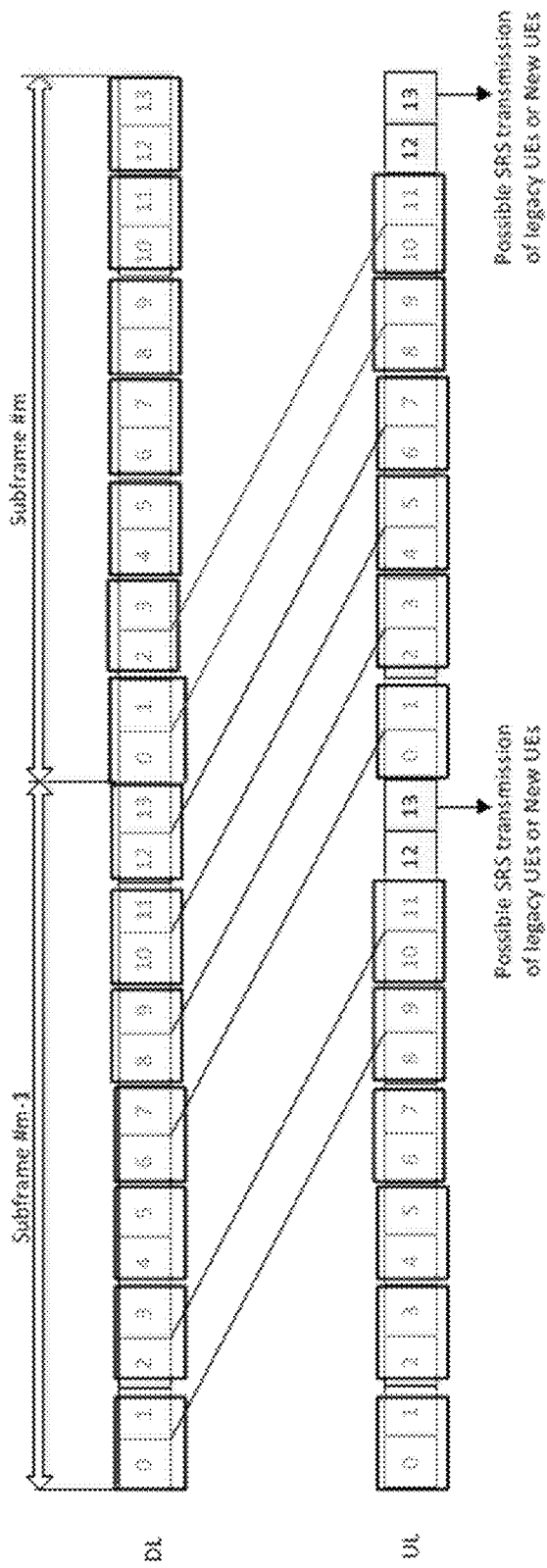
FIG. 11 is a diagram schematically illustrating further exemplary DL and UL subframe structures based on short TTIs according to an embodiment of the present disclosure.

FIG. 11 is a diagram schematically illustrating further exemplary DL and UL subframe structures based on short TTIs according to an embodiment of the present disclosure.

As shown in FIG. 11, the last symbol #13 in each UL subframe is reserved for potential SRS transmission, without transmitting ACK/NACK feedback information for downlink data. It may be assumed that the UL subframes and DL subframes support only 2-symbol-based TTI. As a consequence, symbol #12 in each UL subframe may remain without transmitting any feedback information. Since in this situation, the number of UL TTIs of a UL subframe is less than the number of DL TTIs of a corresponding DL subframe, the DL TTI (including symbols #4, #5) which is k-TTI-earlier than the last two symbols #12, #13 of each DL downlink subframe is arranged not to transmit downlink data from the base station to the user equipment.

Figure 12:
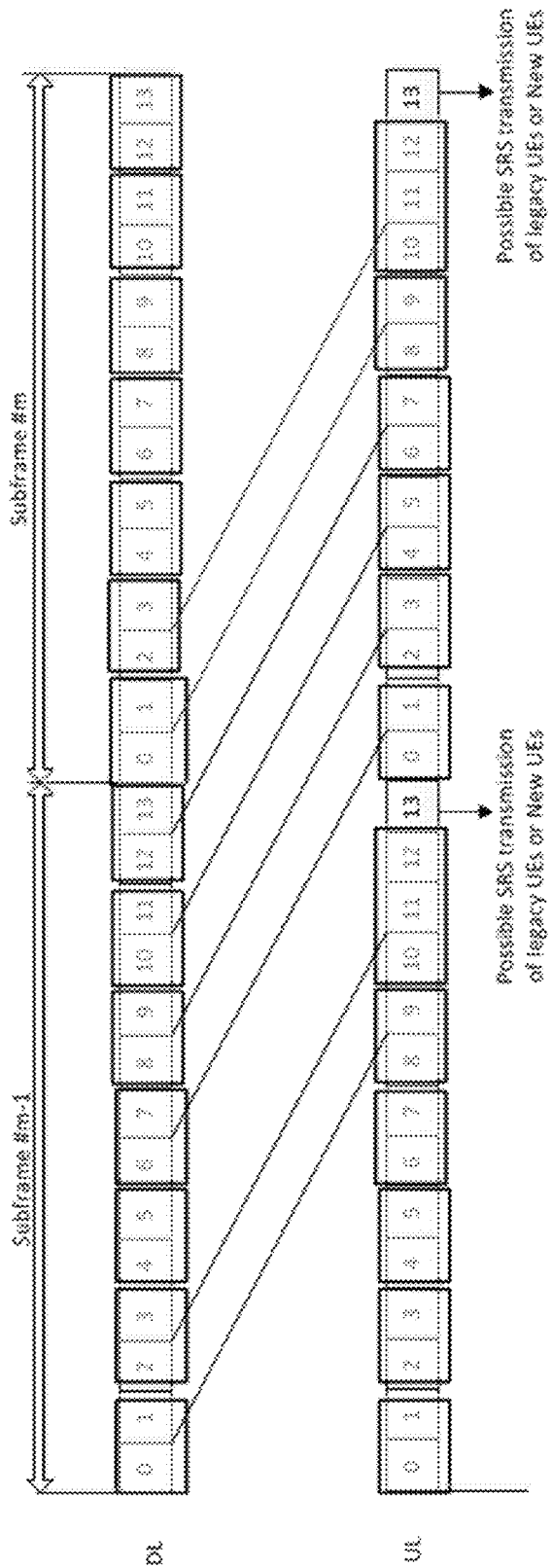
FIG. 12 is a diagram schematically illustrating further exemplary DL and UL subframe structures based on short TTIs according to an embodiment of the present disclosure.

FIG. 12 is a diagram schematically illustrating further exemplary DL and UL subframe structures based on short TTIs according to an embodiment of the present disclosure.

Similar to FIG. 11, in the example of FIG. 12, the last symbol #13 in each UL subframe is reserved for potential SRS transmission, without transmitting ACK/NACK feedback information for downlink data. Differently, in FIG. 12, symbol #12 is included into a 3-symbol-based UL TTI, which corresponds symbols #10, #11, #12 in UL subframes.

In order to improve the efficiency for utilization of DL transmission resource, new schemes of ACK/NACK feedback bundling and delay may be introduced to solve the problem of DL and UL TTI number mismatch due to the presence of the reserved symbol for potential SRS transmission.

Figure 13:
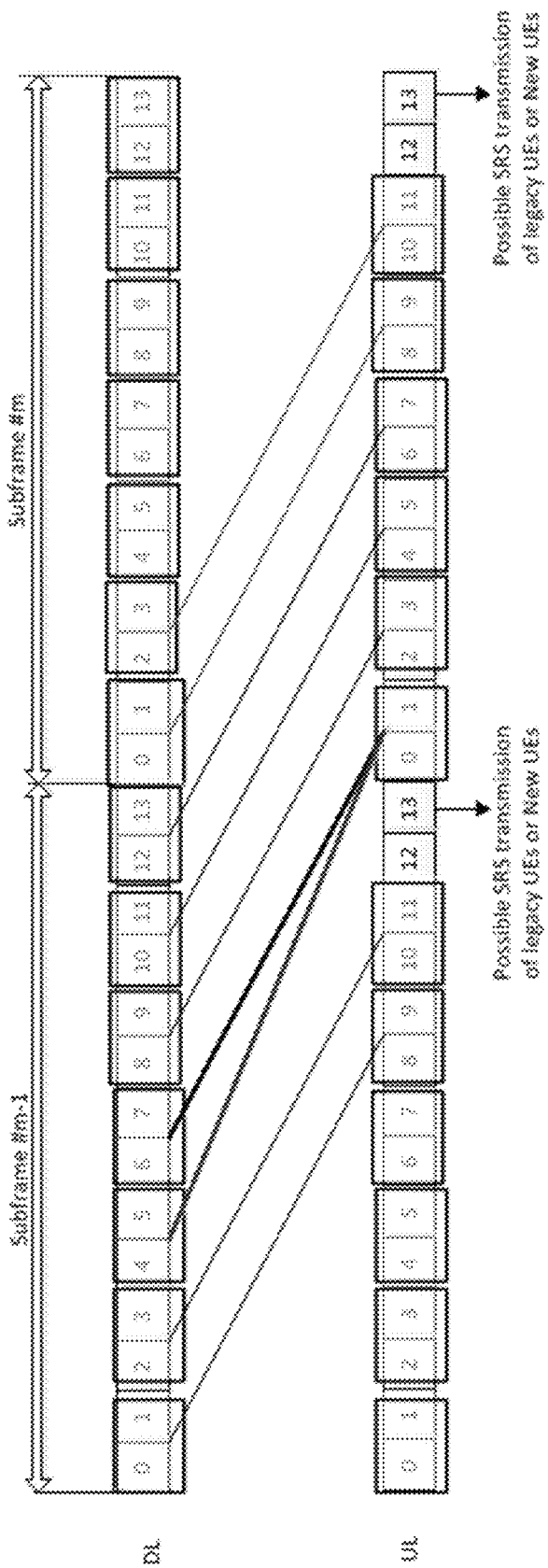
FIG. 13 is a diagram schematically illustrating further exemplary DL and UL subframe structures based on short TTIs according to an embodiment of the present disclosure.

FIG. 13 is a diagram schematically illustrating further exemplary DL and UL subframe structures based on short TTIs according to an embodiment of the present disclosure.

As described above, if the base station schedules downlink data in the DL TTI which includes symbols #4, #5 of DL subframe #m−1, then according to the conventional DL scheduling scheme, ACK/NACK feedback for the downlink data transmitted in the DL TTI of symbols #4, #5 of DL subframe #m−1 is likely to collide with the SRS transmission. Instead of arranging no downlink transmission in the DL TTI of symbols #4, #5 of DL subframe #m−1, the base station may still use the DL TTI of symbols #4, #5 to transmit downlink data. In this case, the user equipment may feed back bundled ACK/NACK feedback information in the adjacent UL TTI of symbols #0, #1 in DL subframe #m for both DL data transmission in the two DL TTIs, i.e., the DL TTI of symbols #4, #5 and the DL TTI of symbols #6, #7 in DL subframe #m−1. That means, the ACK/NACK feedback information transmitted in the first TTI of each of the uplink subframes may be arranged to further indicate whether the downlink data transmitted in a downlink TTI (k+1)-TTI-earlier than the last downlink TTI of a corresponding downlink subframe is successfully decoded in the user equipment. The bundled ACK/NACK feedback information may be calculated by logic AND operation between ACK/NACK information of the two TTI, i.e., the DL TTI of symbols #4, #5 and the DL TTI of symbols #6, #7 in the previous DL subframe.

Figure 14:
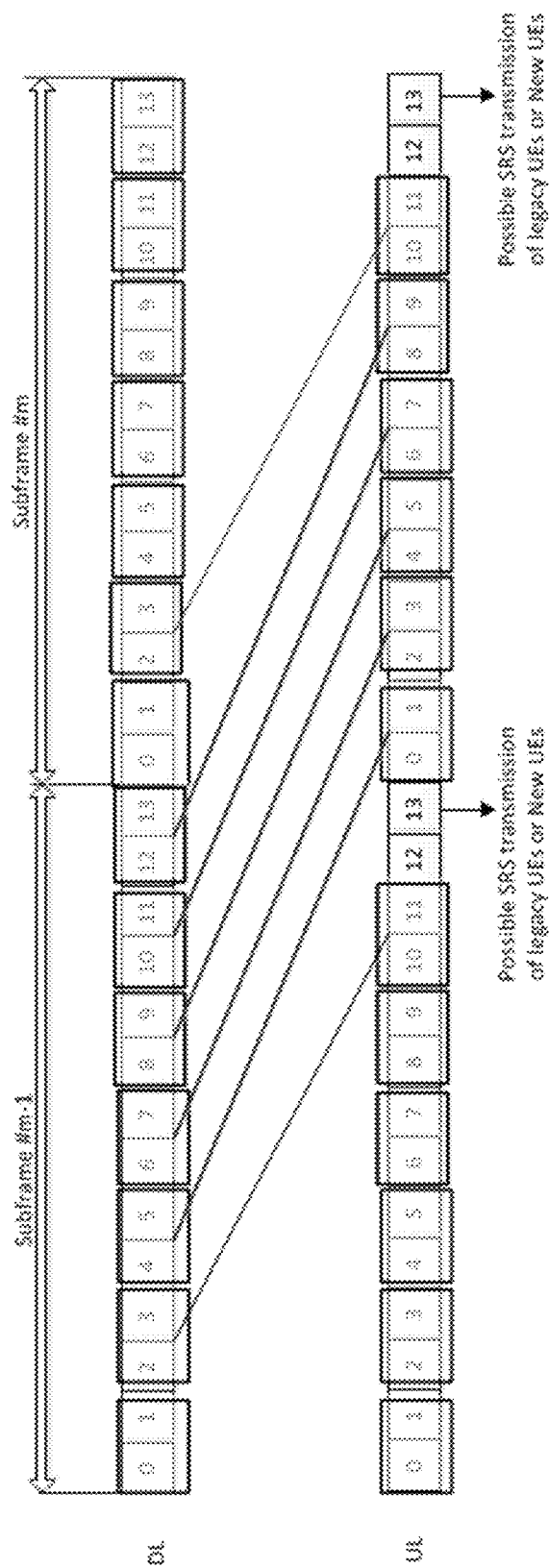
FIG. 14 is a diagram schematically illustrating further exemplary DL and UL subframe structures based on short TTIs according to an embodiment of the present disclosure.

FIG. 14 is a diagram schematically illustrating further exemplary DL and UL subframe structures based on short TTIs according to an embodiment of the present disclosure. A ACK/NACK feedback delay scheme is illustrated with reference to FIG. 14.

As shown in FIG. 14, when the k-TTI delayed ACK/NACK feedback for the downlink data transmitted in the DL TTI of symbols #4, #5 collides with SRS transmission, the corresponding UL ACK/NACK feedback in the subsequent UL TTIs may start to delay 1 more UL TTI until the originally corresponding DL TTI is the first DL TTI of next DL subframe #m. In this way, the ACK/NACK feedback information for the downlink data transmitted in the DL TTI of symbols #4, #5 in DL subframe #m−1 may be fed back in the first UL TTI of symbols #0, #1 in UL subframe #m. Similarly, the ACK/NACK feedback information for the downlink data transmitted in the DL TTIs of symbols #6, #7, symbols #8, #9, symbols #10, #11, symbols #12, #13 may be also delayed 1 UL TTI.

Because the first DL TTI of each subframe may correspond to legacy PDCCH region, i.e. there may be no DL data transmission in the DL TTI of symbols #0, #1. Therefore, compared k-TTI delayed ACK/NACK feedback for the DL TTIs of symbols #0, #1, symbols #2, #3 in a DL subframe, ACK/NACK feedback for DL TTIs of symbols #4, #5, symbols #6, #7, symbols #8, #9, symbols #10, #11, symbols #12, #13 are delayed k+1 TTIs.

FIGS. 13 and 14 illustrate the ACK/NACK feedback bundling and delay schemes based on the DL and UL subframe structure as depicted in FIG. 11. It is apparent to those skilled in the art that the ACK/NACK feedback bundling and delay schemes may also be applicable to the DL and UL subframe structure as depicted in FIG. 12 and even various other suitable DL and UL subframe structures, for example, the subframe structures based on 1-symbol-based TTIs, 2-symbol-based TTIs, 3-symbol-based TTIs, 4-symbol-based TTIs, . . . , 13-symbol-based TTI and any feasible combination thereof.

According to a further aspect of the present disclosure, there also provides embodiments for reducing overhead for both DL data transmission process and the UL data scheduling process based on short TTIs.

Figure 15A:
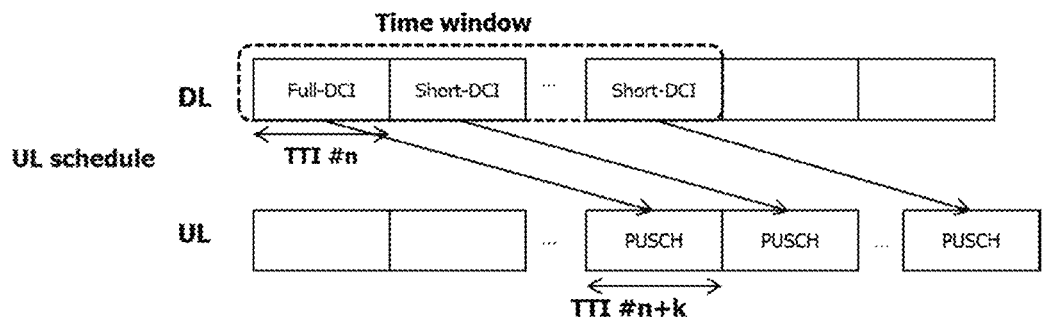
FIGS. 15A, 15B are diagrams schematically illustrating further exemplary DL and UL subframe structures based on short TTIs according to an embodiment of the present disclosure.
Figure 15B:
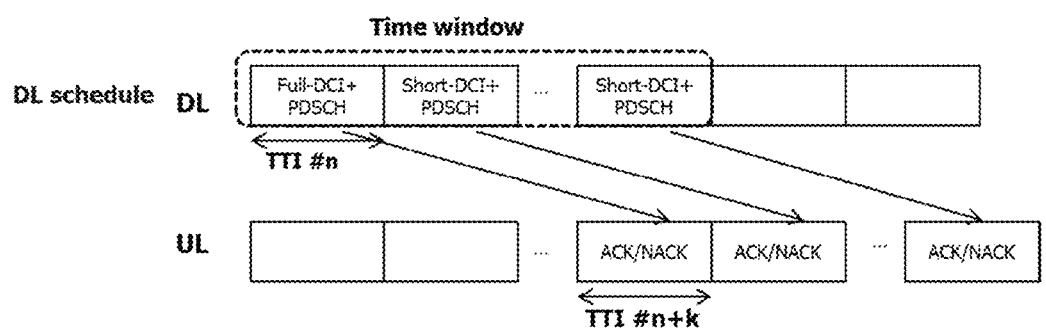

FIGS. 15A, 15B are diagrams schematically illustrating further exemplary DL and UL subframe structures based on short TTIs according to one or more embodiment of the present disclosure.

Specifically, FIG. 15A illustrates exemplary DL and UL subframe structures for a UL scheduling process. As shown in FIG. 15A, during an uplink data scheduling process, the base station transmits to a user equipment DCI for uplink data scheduling in a DL TTI #n of a downlink subframe which supports two or more downlink TTIs. According to the received DCI, the user equipment transmits PUSCH in the UL TTI #n+k.

Because the short TTI length (e.g. 2-symbol-based TTI) is much smaller than the legacy one. Therefore, in the-short-TTI-based subframe, control signaling may occupy relatively much physical resources.

According to the embodiment of the present disclosure, a time window can be configured for the DL TTIs of a DL subframe so that the overhead caused by sending DCI in every short DL TTI can be reduced by arranging only one DL TTI within the time window to transmit DCI in an full format and arranging the remaining DL TTI(s) within the time window to transmit the downlink control information in a short format.

The full format of DCI may be or may not be same as legacy DCI format, which includes resource allocation fields, MCS fields, etc. In one implementation of the embodiment, the short format of DCI may contain only fields which are a subset of fields defined in the full format of DCI. In another implementation of the embodiment, the short format of DCI may contain fields which are with limited lengths compared with corresponding fields defined in the full format of DCI. Moreover, it should be appreciated that the above two example implementations may also be combined to form a suitable short format of DCI.

According to an implementation of the embodiment, the user equipment may detect the full format of DCI. If it is detected in a DL TTI, then the user equipment may only detect the short format of DCI in the remaining DL TTIs in the same time window. Based on the detected full format DCI, the user equipment may recover the full format of the DCI in the short format, so as to transmit PUSCH in the corresponding UL TTI according to the recovered DCI.

According to one embodiment of the present disclosure, one downlink subframe is divided into two time windows in an uplink data scheduling procedure.

Figure 16:
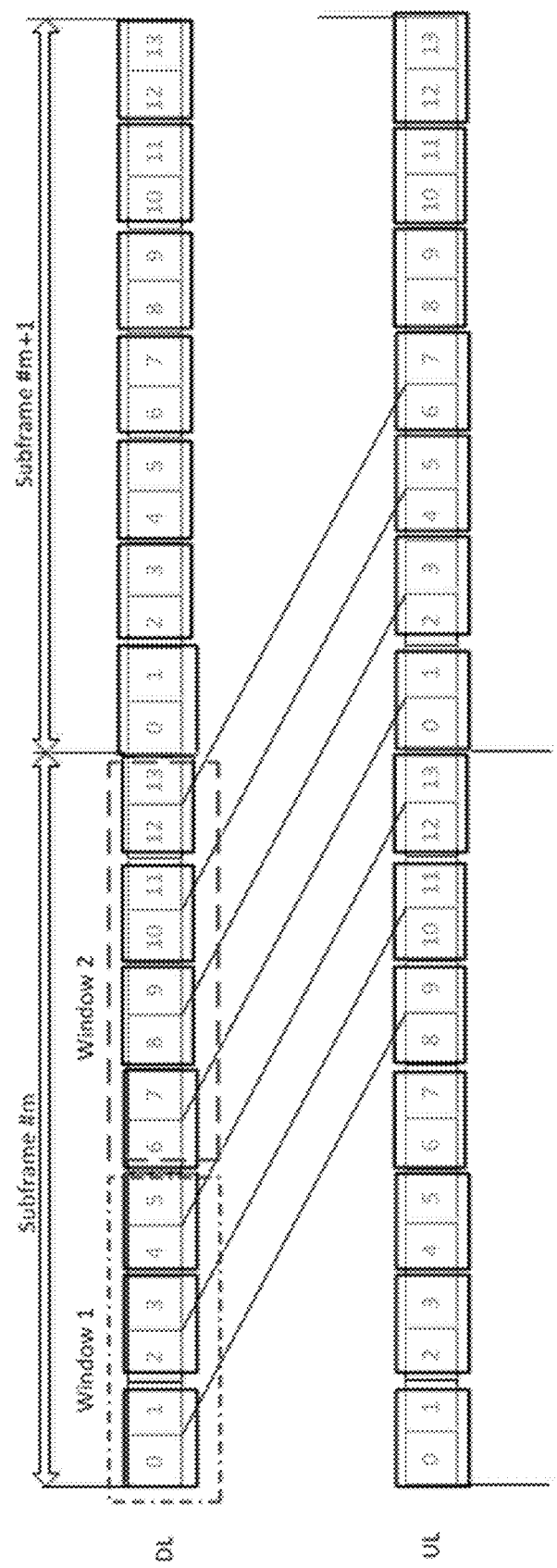
FIG. 16 is a diagram schematically illustrating further exemplary DL and UL subframe structures based on short TTIs according to an embodiment of the present disclosure.

FIG. 16 is a diagram schematically illustrating further exemplary DL and UL subframe structures based on short TTIs according to an embodiment of the present disclosure where one DL subframe is divided into two time windows. Uplink data scheduled in downlink TTIs within one time window of a $m^{th}$ downlink subframe may be uplink-transmitted in a $m^{th}$ uplink subframe and uplink data scheduled in downlink TTIs within the other time window of the $m^{th}$ downlink subframe may be uplink-transmitted in a $(m+1)^{th}$ uplink subframe.

As shown in FIG. 16, a DL subframe #m−1 is divided into two time windows, i.e., Windows #1, #2. Window #1 includes three DL TTIs of symbols #0, #1, symbols #2, #3 and symbols #4, #5 of DL subframe #m. It can be seen that those three DL TTIs in Window #1 are arranged to schedule the PUSCH transmission in the UL TTIs of the DL subframe #m−1. Window #2 includes four DL TTIs of symbols #6, #7, symbols #8, #9, symbols #10, #11, symbols #12, #13 of DL subframe #m+1. Unlikely with the three DL TTIs in Window #1, those four DL TTIs in Window #2 are arranged to schedule the PUSCH transmission in the UL TTIs of subframe #m.

FIG. 15B illustrates exemplary DL and UL subframe structures for a DL data transmission process. As shown in FIG. 15B, during a downlink data transmission process, the base station transmits to a user equipment downlink data and DCI for downlink data transmission in a DL TTI #n of a downlink subframe, which supports two or more downlink TTIs. The user equipment receives from the base station the downlink data transmitted in DL TTI #n. According to DCI, ACK/NACK feedback information for the downlink data is transmitted to the base station in UL TTI #n+k.

Similar as the embodiment described with reference to FIG. 15A, according to the embodiment of FIG. 14, a time window can be configured for the DL TTIs of a DL subframe so that the overhead caused by sending DCI in every short DL TTI can be reduced by arranging only one DL TTI within the time window to transmit DCI in an full format and arranging the remaining DL TTI(s) within the time window to transmit the downlink control information in a short format.

The full format of DCI may be or may not be same as legacy DCI format, which includes resource allocation fields, MCS fields, etc. In one implementation of the embodiment, the short format of DCI may contain only fields which are a subset of fields defined in the full format of DCI. In another implementation of the embodiment, the short format of DCI may contain fields which are with limited lengths compared with corresponding fields defined in the full format of DCI. Moreover, it should be appreciated that the above two example implementations may also be combined to form a suitable short format of DCI.

According to an implementation of the embodiment, the user equipment may detect the full format of DCI. If it is detected in a DL TTI, then the user equipment may only detect the short format of DCI in the remaining DL TTIs in the same time window. Based on the detected full format DCI, the user equipment may recover the full format of the DCI in the short format, so as to transmit ACK/NACK feedback information for the downlink data in the corresponding UL TTI according to the recovered DCI.

According to one embodiment of the present disclosure, the time window may be set to one downlink subframe in a downlink data transmission procedure.

According to a further aspect of the present disclosure, there also provides further embodiments for the uplink data scheduling process and the downlink data transmission process.

Figure 17:
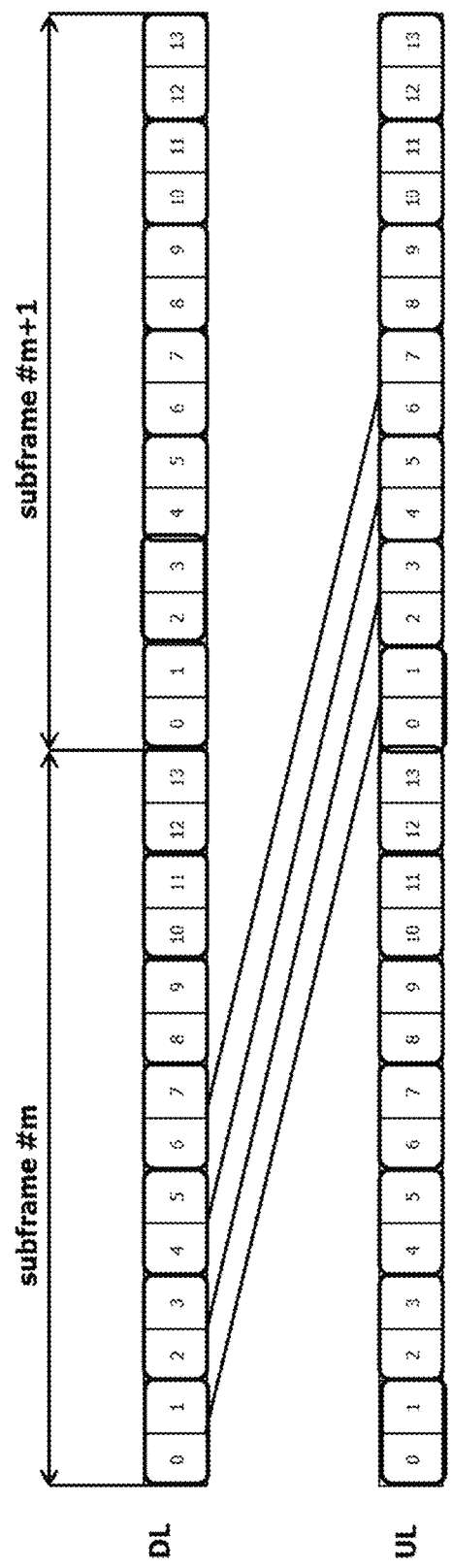
FIG. 17 is a diagram schematically illustrating further exemplary DL and UL subframe structures based on short TTIs according to an embodiment of the present disclosure.

FIG. 17 is a diagram schematically illustrating further exemplary DL and UL subframe structures based on short TTIs according to an embodiment of the present disclosure, based which a base station and a user equipment can perform the uplink data scheduling process and the downlink data transmission process.

As shown in FIG. 17, DL subframes and UL subframes includes, as an example but not limited, 2-symbol-based TTIs. During an uplink data scheduling process, the base station transmits to the user equipment DCI in a $n^{th}$ DL TTI of a $m^{th}$ downlink subframe. Upon receipt of the DCI for scheduling uplink data, the user equipment transmits to the base station the scheduled uplink data in the $n^{th}$ TTI of a $(m+1)^{th}$ uplink subframe. As such, the user equipment delays the scheduled uplink transmission one UL subframe to transmit since it receives the corresponding DCI.

In a similar way, during a downlink data transmission process, the base station transmits to the user equipment downlink data in a $n^{th}$ DL TTI of a $m^{th}$ downlink subframe. Upon receipt of the downlink data, the user equipment transmits to the base station ACK/NACK feedback information in the $n^{th}$ TTI of a $(m+1)^{th}$ uplink subframe. As such, the user equipment delays the ACK/NACK feedback information for the downlink data one UL subframe to transmit since it receives the corresponding DCI.

Figure 18:
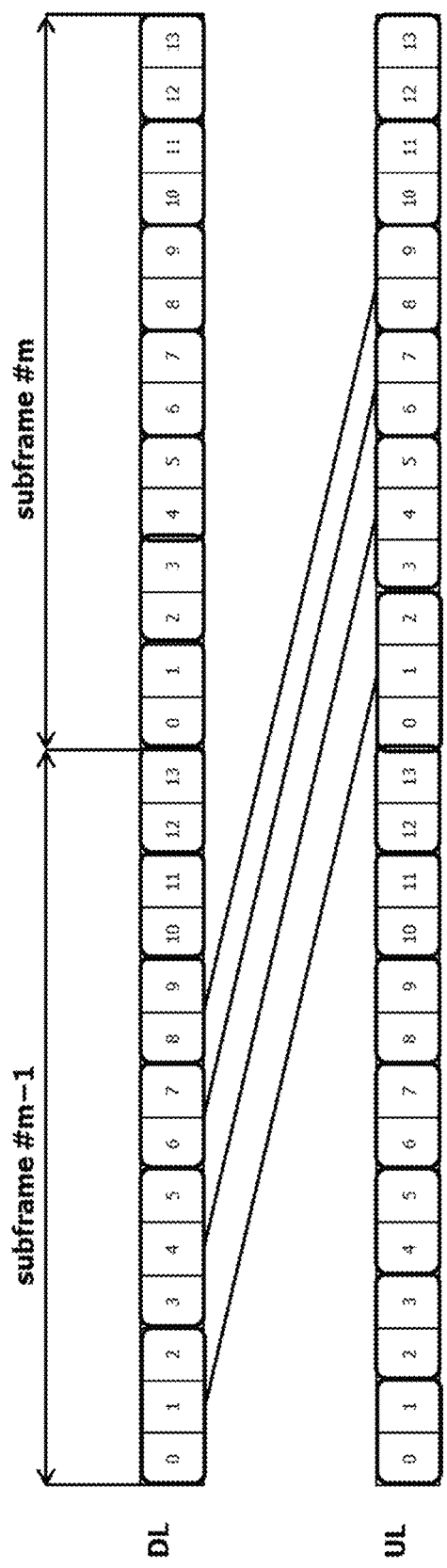
FIG. 18 is a diagram schematically illustrating further exemplary DL and UL subframe structures based on short TTIs according to an embodiment of the present disclosure.

FIG. 18 is a diagram schematically illustrating further exemplary DL and UL subframe structures based on short TTIs according to a further embodiment of the present disclosure.

In the embodiment as shown FIG. 18, the $n^{th}$ DL TTI of DL subframe #m may have a same TTI length as the $n^{th}$ UL TTI of UL subframe #m+1. For example, the $1^{st}$ DL TTI of DL subframe #m is a 3-symbol-based TTI, while the $1^{st}$ UL TTI of UL subframe #m+1 may be required to have the same length, i.e., the length of 3 symbols. In this way, each of DL TTIs in DL subframe #m can correspond to a specific UL TTI in UL subframe #m+1.

In an alternative embodiment, it may be required that the number of downlink TTIs supported by the $m^{th}$ downlink subframe is equal to the number of uplink TTIs supported by the $(m+1)^{th}$ uplink subframe, thereby each of DL TTIs in DL subframe #m corresponds to a specific UL TTI in UL subframe #m+1.

Figure 19:
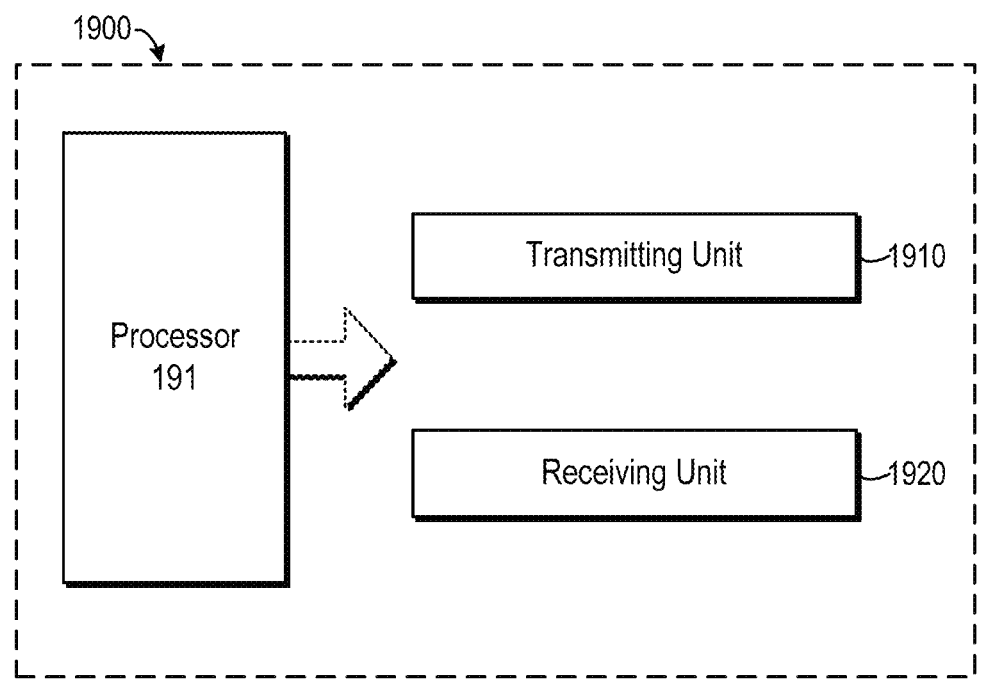
FIG. 19 is a block diagram schematically illustrating a base station according to an embodiment of the present disclosure.

FIG. 19 is a block diagram schematically illustrating a base station according to an embodiment of the present disclosure.

As shown in FIG. 19, the base station 1900 is configured to communicate with one or more user equipments based downlink and uplink subframe structures having short TTIs. The base station 1900 comprises: a transmitting unit 1910 and a receiving unit 1920. The base station 600 may also comprise suitable radio frequency transceivers (not shown in FIG. 19) that may be selectively coupled with one or more antenna(s) (not shown in FIG. 19) which are used to transmit signals to, and receive signals from, one or more user equipments.

The base station 1900 comprises a processor 191, which may include one or more microprocessor or microcontrollers, as well as other digital hardware, which may include digital signal processors (DSPs), special-purpose digital logic, and the like. The processor 191 may be configured to execute program code stored in memory (not shown in FIG. 19), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processor 191 may be used to cause the transmitting unit 1910 and the receiving unit 1920 to perform corresponding functions according one or more embodiments of the present disclosure.

According to one or more embodiments of one aspect of the present disclosure, the transmitting unit 1910 is configured to transmit, to a user equipment, downlink control information in a downlink TTI of a $m^{th}$ downlink subframe which supports two or more downlink TTIs. The receiving unit 1920 is configured to receive, from the user equipment, uplink data scheduled by the downlink control information. The uplink data is carried in a $m^{th}$ or $(m+1)^{th}$ uplink subframe which supports two or more uplink TTIs.

The downlink control information transmitted in at least one of downlink TTIs supported by downlink subframes is arranged to schedule uplink data transmission in at least two of uplink TTIs supported by uplink subframes, for example, in the case of a mismatch between the number of DL TTIs in DL subframes and the number of UL TTIs in UL subframes.

According to one or more embodiments of the present disclosure, at least one of uplink TTIs supported by uplink subframes may be arranged to transmit at least an uplink demodulation reference signal for the user equipment, for example, in the case of a mismatch between the number of DL TTIs in DL subframes and the number of UL TTIs in UL subframes.

In an embodiment, the $m^{th}$ downlink subframe may be arranged to support 2-symbol-based TTIs and at least one 3-symbol-based TTI. And the $m^{th}$ or $(m+1)^{th}$ uplink subframe may be arranged to support 2-symbol-based TTIs. In a further embodiment, at least the last downlink TTI of a downlink subframe may be arranged to schedule uplink data transmission in at least two of uplink TTIs supported by uplink subframes.

According to one or more embodiments of another aspect of the present disclosure, the transmitting unit 1910 and the receiving unit 1920 can be configured to perform an uplink data scheduling process based on the downlink and uplink subframe structures where one uplink TTI in each of the uplink subframes is arranged to only transmit uplink demodulation reference signals of user equipments scheduled by the base station, instead of scheduled uplink data.

In an embodiment, the special TTI may be a one-symbol-based TTIs. In particular, in one embodiment, each of the uplink subframes is arranged to support a one-symbol-based TTI for sounding reference signal transmission.

According to one or more embodiments of other aspects of the present disclosure, the transmitting unit 1910 and the receiving unit 1920 are configured to perform a downlink data transmission procedure.

According to one or more embodiments of this aspect of the present disclosure, the transmitting unit 1910 is configured to transmit, to a user equipment, downlink data in a downlink TTI of a $m^{th}$ downlink subframe which supports two or more downlink TTIs. The receiving unit 1920 is configured to receive, from the user equipment, ACK/NACK feedback information for the transmitted downlink data in an uplink TTI, which is k-TTI later than the downlink TTI in which the downlink data is transmitted. The ACK/NACK feedback information is carried in a $m^{th}$ or $(m+1)^{th}$ uplink subframe which supports two or more uplink TTIs.

According to one or more embodiments of one aspect of the present disclosure, the last TTI of an uplink subframe is arranged to transmit sounding reference signals, without ACK/NACK feedback information for downlink data transmission.

According to one embodiment of this aspect of the present disclosure, the ACK/NACK feedback information transmitted in the first TTI of each of the uplink subframes may be arranged to further indicate whether the downlink data transmitted in a downlink TTI (k+1)-TTI-earlier than the last downlink TTI of a corresponding downlink subframe is successfully decoded in the user equipment.

According to one embodiment of this aspect of the present disclosure, the last TTI of the uplink subframe for transmitting sounding reference signals may be a 2-symbol-based TTI. Alternatively, in another embodiment, the last TTI of the uplink subframe for transmitting sounding reference signals may also be a 1-symbol-based TTI.

According to one or more embodiments of yet another aspect of the present disclosure, the transmitting unit 1910 is configured to transmit, to a user equipment, downlink data in a downlink TTI of a $m^{th}$ downlink subframe which supports two or more downlink TTIs. The receiving unit 1920 is configured to receive, from the user equipment ACK/NACK feedback information for the transmitted downlink data in an uplink TTI which is k-TTI or (k+1)-TTI later than the downlink TTI in which the downlink data is transmitted. The ACK/NACK feedback information is carried in a $m^{th}$ or $(m+1)^{th}$ uplink subframe which supports two or more uplink TTIs.

According to one or more embodiments of this aspect of the present disclosure, the first TTI of a downlink subframe is arranged to transmit downlink control information, and the last TTI of an uplink subframe is arranged to transmit sounding reference signals, without ACK/NACK feedback information for downlink data transmission.

According to one embodiment of this aspect of the present disclosure, the last TTI of the uplink subframe for transmitting sounding reference signals may be a 2-symbol-based TTI. Alternatively, the last TTI of the uplink subframe for transmitting sounding reference signals may also a 1-symbol-based TTI.

According to one or more embodiments of yet another aspect of the present disclosure, the transmitting unit 1920 is configured to transmit, to a user equipment, downlink control information for uplink data scheduling or downlink data transmission in a downlink transmission time interval, TTI, of a downlink subframe which supports two or more downlink TTIs. During a predefined time window that contains at least two TTIs, only one TTI of the at least two TTIs is arranged to transmit the downlink control information in a full format and the remaining TTI(s) of the at least two TTIs is arranged to transmit the downlink control information in a short format.

According to one embodiment of this aspect of the present disclosure, the short format of the downlink control information may contain fields which are a subset of fields defined in the full format of the downlink control information. In an alternative embodiment, the short format of the downlink control information may contain fields which are with limited lengths compared with corresponding fields defined in the full format of the downlink control information.

According to one embodiment of this aspect of the present disclosure, the time window may be set to one downlink subframe in a downlink data transmission procedure.

Additionally or alternatively, one downlink subframe may be divided into two time windows in an uplink data scheduling procedure. According to an example implementation, it would be advantageous to arrange the two time windows with in a $m^{th}$ downlink subframe so that uplink data scheduled in downlink TTIs within one time window are uplink-transmitted in a $m^{th}$ uplink subframe and uplink data scheduled in downlink TTIs within the other time window are uplink-transmitted in a $(m+1)^{th}$ uplink subframe.

According to embodiments of yet another aspect of the present disclosure, during an uplink data scheduling process, the transmitting unit 1910 is configured to transmit, to a user equipment, downlink control information in a $n^{th}$ downlink TTI of a $m^{th}$ downlink subframe which supports two or more downlink TTIs. The receiving unit 1920 is configured to receive, from the user equipment, uplink data scheduled by the downlink control information in a $n^{th}$ uplink TTI of a $(m+1)^{th}$ uplink subframe which supports two or more uplink TTIs.

In one or more embodiments, during a downlink data transmission process, the transmitting unit 1910 is configured to transmit, to a user equipment, downlink control information and downlink data in a $n^{th}$ downlink TTI of a $m^{th}$ downlink subframe which supports two or more downlink TTIs. A receiving unit 1920 is configured to receive, from the user equipment, ACK/NACK feedback information for the transmitted downlink data in a $n^{th}$ TTI of a $(m+1)^{th}$ uplink subframe which supports two or more uplink TTIs.

According to an embodiment of this aspect of the present disclosure, the $n^{th}$ downlink TTI of the $m^{th}$ downlink subframe may have a same TTI length with the $n^{th}$ uplink TTI of the $(m+1)^{th}$ uplink subframe.

Additionally or alternatively, it may be required that the number of downlink TTIs supported by the $m^{th}$ downlink subframe is equal to the number of uplink TTIs supported by the $(m+1)^{th}$ uplink subframe.

Figure 20:
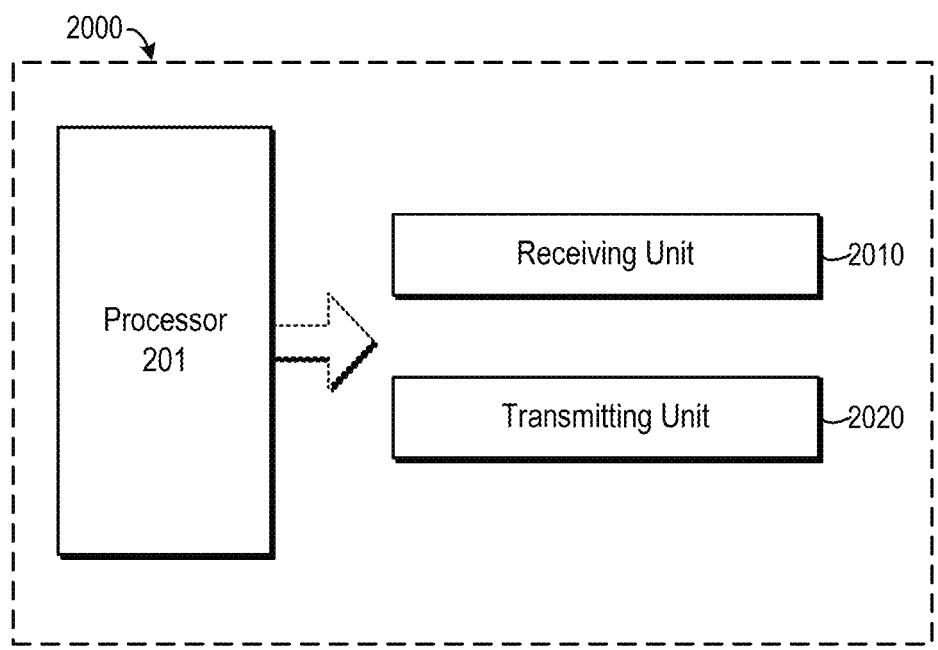
FIG. 20 is a block diagram schematically illustrating a user equipment according to an embodiment of the present disclosure.

FIG. 20 is a block diagram schematically illustrating a user equipment 2000 according to an embodiment of the present disclosure.

As shown in FIG. 20, the user equipment 2000 is configured to communicate with a base station based downlink and uplink subframe structures having short TTIs. The user equipment 2000 comprises a receiving unit 2010 and a transmitting unit 2020. The user equipment 2000 may also comprise multiple suitable radio frequency transceivers (not shown in FIG. 20) that may be operably coupled with one or more antenna(s) (not shown in FIG. 20) which are used to transmit signals to, and receive signals from, other radio nodes such as a NodeB, an eNodeB or a WiFi AP.

The user equipment 2000 comprises a processor 201, which may include one or more microprocessor or microcontrollers, as well as other digital hardware, which may include digital signal processors (DSPs), special-purpose digital logic, and the like. The processor 201 may be configured to execute program code stored in memory (not shown in FIG. 20), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processor 201 may be used to cause the receiving unit 2010 and the transmitting unit 2020 to perform corresponding functions according one or more embodiments of the present disclosure.

According to one or more embodiments of one aspect of the present disclosure, a receiving unit 2010 is configured to receive, from a base station, downlink control information in a downlink TTI of a $m^{th}$ downlink subframe which supports two or more downlink TTIs. The transmitting unit 2020 is configured to transmit, to the base station, uplink data scheduled by the downlink control information, which is carried in a $m^{th}$ or $(m+1)^{th}$ uplink subframe which supports two or more uplink TTIs.

The downlink control information transmitted in at least one of downlink TTIs supported by downlink subframes is arranged to schedule uplink data transmission in at least two of uplink TTIs supported by uplink subframes, for example, in the case of a mismatch between the number of DL TTIs in DL subframes and the number of UL TTIs in UL subframes.

According to one or more embodiments of the present disclosure, at least one of uplink TTIs supported by uplink subframes may be arranged to transmit at least an uplink demodulation reference signal for the user equipment, for example, in the case of a mismatch between the number of DL TTIs in DL subframes and the number of UL TTIs in UL subframes.

In an embodiment, the $m^{th}$ downlink subframe may be arranged to support 2-symbol-based TTIs and at least one 3-symbol-based TTI. And the $m^{th}$ or $(m+1)^{th}$ uplink subframe may be arranged to support 2-symbol-based TTIs. In a further embodiment, at least the last downlink TTI of a downlink subframe may be arranged to schedule uplink data transmission in at least two of uplink TTIs supported by uplink subframes.

According to one or more embodiments of another aspect of the present disclosure, the receiving unit 2010 and the transmitting unit 2020 can be configured to perform an uplink data scheduling process based on the downlink and uplink subframe structures where one uplink TTI in each of the uplink subframes is arranged to only transmit uplink demodulation reference signals of user equipments scheduled by the base station, instead of scheduled uplink data.

In an embodiment, the special TTI may be a one-symbol-based TTIs. In particular, in one embodiment, each of the uplink subframes is arranged to support a one-symbol-based TTI for sounding reference signal transmission.

According to one or more embodiments of other aspects of the present disclosure, the receiving unit 2010 and the transmitting unit 2020 are configured to perform a downlink data transmission procedure.

According to one or more embodiments of the aspects of the present disclosure, the receiving unit 2010 is configured to receive, from a base station, downlink data in a downlink TTI of a $m^{th}$ downlink subframe which supports two or more downlink TTIs. The transmitting unit 2020 is configured to transmit, to the base station, ACK/NACK feedback information for the downlink data in an uplink TTI, which is k-TTI-later than the downlink TTI in which the downlink data is transmitted from the base station. The ACK/NACK feedback information is carried in a $m^{th}$ or $(m+1)^{th}$ uplink subframe which supports two or more uplink TTIs.

According to one or more embodiments of one aspect of the present disclosure, the last TTI of an uplink subframe is arranged to transmit sounding reference signals, without ACK/NACK feedback information for downlink data transmission.

According to one embodiment of this aspect of the present disclosure, the ACK/NACK feedback information transmitted in the first TTI of each of the uplink subframes may be arranged to further indicate whether the downlink data transmitted in a downlink TTI (k+1)-TTI-earlier than the last downlink TTI of a corresponding downlink subframe is successfully decoded in the user equipment.

According to one embodiment of this aspect of the present disclosure, the last TTI of the uplink subframe for transmitting sounding reference signals may be a 2-symbol-based TTI. Alternatively, in another embodiment, the last TTI of the uplink subframe for transmitting sounding reference signals may also be a 1-symbol-based TTI.

According to one or more embodiments of yet another aspect of the present disclosure, the receiving unit 2010 is configured to receive, from a base station, downlink data in a downlink TTI of a $m^{th}$ downlink subframe which supports two or more downlink TTIs. The transmitting unit 2010 is configured to transmit, to the base station, ACK/NACK feedback information for the downlink data in an uplink TTI, which is k-TTI or (k+1)-TTI later than the downlink TTI in which the downlink data is transmitted from the base station. The ACK/NACK feedback information is carried in a $m^{th}$ or $(m+)^{th}$ uplink subframe which supports two or more uplink TTIs.

According to one or more embodiments of this aspect of the present disclosure, the first TTI of a downlink subframe is arranged to transmit downlink control information, and the last TTI of an uplink subframe is arranged to transmit sounding reference signals, without ACK/NACK feedback information for downlink data transmission.

According to one embodiment of this aspect of the present disclosure, the last TTI of the uplink subframe for transmitting sounding reference signals may be a 2-symbol-based TTI. Alternatively, the last TTI of the uplink subframe for transmitting sounding reference signals may also a 1-symbol-based TTI.

According to one or more embodiments of yet another aspect of the present disclosure, the receiving unit 2010 is configured to receive, from a base station, downlink control information for uplink data scheduling or downlink control information for downlink data transmission in a downlink TTI of a downlink subframe which supports two or more downlink TTIs. During a predefined time window that contains at least two TTIs, only one TTI of the at least two TTIs is arranged to transmit the downlink control information in a full format and the remaining TTI(s) of the at least two TTIs is arranged to transmit the downlink control information in a short format.

According to one embodiment of this aspect of the present disclosure, the short format of the downlink control information may contain fields which are a subset of fields defined in the full format of the downlink control information. In an alternative embodiment, the short format of the downlink control information may contain fields which are with limited lengths compared with corresponding fields defined in the full format of the downlink control information.

According to one embodiment of this aspect of the present disclosure, the time window may be set to one downlink subframe in a downlink data transmission procedure.

Additionally or alternatively, one downlink subframe may be divided into two time windows in an uplink data scheduling procedure. According to an example implementation, it would be advantageous to arrange the two time windows with in a $m^{th}$ downlink subframe so that uplink data scheduled in downlink TTIs within one time window are uplink-transmitted in a $m^{th}$ uplink subframe and uplink data scheduled in downlink TTIs within the other time window are uplink-transmitted in a $(m+1)^{th}$ uplink subframe.

According to embodiments of yet another aspect of the present disclosure, during an uplink data scheduling process, the receiving unit 2010 is configured to receive, from a base station, downlink control information in a $n^{th}$ downlink TTI of a $m^{th}$ downlink subframe which supports two or more downlink TTIs. The transmitting unit is configured to transmit, to the base station, uplink data scheduled by the downlink control information in a $n^{th}$ uplink TTI of a $(m+1)^{th}$ uplink subframe which supports two or more uplink TTIs.

In one or more embodiments, during a downlink data transmission process, the receiving unit 2010 is configured to receive, from a base station, downlink control information and downlink data in a $n^{th}$ downlink TTI of a $m^{th}$ downlink subframe which supports two or more downlink TTIs. The transmitting unit 2020 is configured to transmit, to the base station, ACK/NACK feedback information for the transmitted downlink data in a $n^{th}$ uplink TTI of a $(m+1)^{th}$ uplink subframe which supports two or more uplink TTIs.

According to an embodiment of this aspect of the present disclosure, the $n^{th}$ downlink TTI of the $m^{th}$ downlink subframe may have a same TTI length with the $n^{th}$ uplink TTI of the $(m+1)^{th}$ uplink subframe.

Additionally or alternatively, it may be required that the number of downlink TTIs supported by the $m^{th}$ downlink subframe is equal to the number of uplink TTIs supported by the $(m+1)^{th}$ uplink subframe.

In general, the various exemplary embodiments may be implemented in hardware or special purpose circuits, software, logical or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block and signaling diagrams, it is well understood that these blocks, apparatus, systems, techniques or methods described herein may be implemented in, as non-limiting examples, hardware, software, firmware, special purpose circuits or logical, general purpose hardware or controller or other computing devices, or some combination thereof.

As such, it should be appreciated that at least some aspects of the exemplary embodiments of the disclosure may be practiced in various components such as integrated circuit chips and modules. As well known in the art, the design of integrated circuits is by and large a highly automated process.

The present disclosure may also be embodied in the computer program product which comprises all features capable of implementing the method as depicted herein and may implement the method when loaded to the computer system.

The present disclosure has been specifically illustrated and explained with reference to the preferred embodiments. The skilled in the art should understand various changes thereto in form and details may be made without departing from the spirit and scope of the present disclosure.

What is claimed is:

1. A method for communication by a user equipment operating in a wireless communication system, comprising:
    detecting a first downlink control information received from a base station;
    detecting a second downlink control information received from the base station within a time window,
    wherein the second downlink control information is received as a short format compared with a format of the first downlink control information; and
    determining a physical uplink shared channel (PUSCH) transmission according to the first downlink control information and the second downlink control information.

2. The method of claim 1 further comprising performing the PUSCH transmission based on both the first downlink control information and the second downlink control information.

3. The method of claim 1, wherein the time window is configured by the base station.

4. The method of claim 1, wherein both the first downlink control information and the second downlink control information are received within the time window.

5. The method of claim 1, wherein both the first down control information and the second downlink control information comprise information used to schedule the PUSCH transmission of the user equipment.

6. The method of claim 1, wherein the second downlink control information is received after the first downlink control information within the time window.

7. The method of claim 1, wherein the first downlink control information is used to schedule the PUSCH transmission in a plurality of uplink subframes.

8. The method of claim 1 further comprising performing the PUSCH transmission in at least one subframe considering at least a parameter k and the time window, wherein the parameter k is an integer.

9. The method of claim 1, wherein the first downlink control information is received via the format of the first downlink control information, the format of the first downlink control information comprises at least resource allocation field and modulation and coding scheme (MCS) field.

10. A method for communication by a base station operating in a wireless communication system, comprising:

transmitting a first downlink control information to a user equipment to schedule a physical uplink shared channel (PUSCH) transmission of the user equipment; and transmitting a second downlink control information to the user equipment to determine the PUSCH transmission, wherein the second downlink control information is transmitted with a short format compared with a format of the first downlink control information.

11. The method of claim 10 further comprising:

configuring a time window for the user equipment and the time window is used for determining the PUSCH transmission.

12. The method of claim 10, wherein the second downlink control information is transmitted after the first downlink control information.

13. The method of claim 10, wherein the first control information is to schedule the PUSCH transmission in a plurality of uplink subframes.

14. The method of clam 10, wherein the first downlink control information is transmitted via the format of the first downlink control information, and the format of the first downlink control information comprises at least resource allocation field and modulation and coding scheme (MCS) field.

15. An apparatus for communication operating in a wireless communication system, comprising at least one circuit configured to receive a first downlink control information from a base station;

receive a second downlink control information from the base station within a time window, wherein the second downlink control information is with a short format compared with a format of the first downlink control information; and transmit a physical uplink shared channel (PUSCH) transmission according to the first downlink control information and the second downlink control information.

16. An apparatus for communication operating in a wireless communication system, comprising at least one circuit configured to transmit a first downlink control information to a user equipment to schedule a physical uplink shared channel (PUSCH) transmission of the user equipment; and transmit a second downlink control information to the user equipment to determine the PUSCH transmission, wherein the second downlink control information is transmitted with a short format compared with a format of the first downlink control information.

* * * * *